(12) United States Patent
Wang et al.

(10) Patent No.: US 11,539,251 B2
(45) Date of Patent: Dec. 27, 2022

(54) MOTOR DESIGNS HAVING SPLINE STRUCTURE CONNECTING MOTOR SHAFT AND STATOR STRUCTURE

(71) Applicant: Mitsubishi Electric Research Laboratories, Inc., Cambridge, MA (US)

(72) Inventors: Hongyu Wang, Cambridge, MA (US); Lei Zhou, Austin, TX (US); Bingnan Wang, Belmont, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 259 days.

(21) Appl. No.: 17/071,415

(22) Filed: Oct. 15, 2020

(65) Prior Publication Data
US 2022/0123609 A1 Apr. 21, 2022

(51) Int. Cl.
| | | |
|---|---|---|
| H02K 1/18 | (2006.01) | |
| H02K 21/24 | (2006.01) | |
| H02K 1/16 | (2006.01) | |
| H02K 16/04 | (2006.01) | |
| H02K 21/22 | (2006.01) | |
| H02K 7/00 | (2006.01) | |

(52) U.S. Cl.
CPC ............ *H02K 1/187* (2013.01); *H02K 7/003* (2013.01); *H02K 21/227* (2013.01); *H02K 2201/12* (2013.01)

(58) Field of Classification Search
CPC .......... H02K 1/16; H02K 1/182; H02K 16/04; H02K 21/24
USPC .......................... 310/40 R, 124, 166, 156.49
See application file for complete search history.

(56) References Cited

U.S. PATENT DOCUMENTS

| | | | | |
|---|---|---|---|---|
| 7,999,501 | B2 * | 8/2011 | Atarashi | ................ H02K 16/04 318/720 |
| 2007/0228860 | A1 * | 10/2007 | Rao | ........................ H02K 21/12 310/268 |

FOREIGN PATENT DOCUMENTS

WO      WO-03094328 A1 * 11/2003 ............. H02K 1/182

\* cited by examiner

*Primary Examiner* — Jose A Gonzalez Quinones
(74) *Attorney, Agent, or Firm* — Gennadiy Vinokur; Hironori Tsukamoto

(57) ABSTRACT

An electrical machine that is an outer runner motor having a rotor mounted rotatably about a machine axis, with the rotor rotatively attached to a shaft. A stator assembly having a stator core with a non-ferromagnetic material. An axial-flux yoke with an inner wall rigidly attached on an outer surface of a first edge wall of the stator core, or a radial-flux yoke with a continuous inner wall rigidly attached on a continuous outer wall of the stator core. Wherein the axial-flux yoke or the radial-flux yoke, include laminated sheets and slots. Windings can be positioned in the slots of either the axial-flux stator yoke or the radial-flux stator yoke. Wherein the stator core and the shaft include a spline coupling feature adapted to selectively couple and mate the stator core to the shaft.

20 Claims, 12 Drawing Sheets

400 (see FIG. 4) (Cross-section of motor assembly)

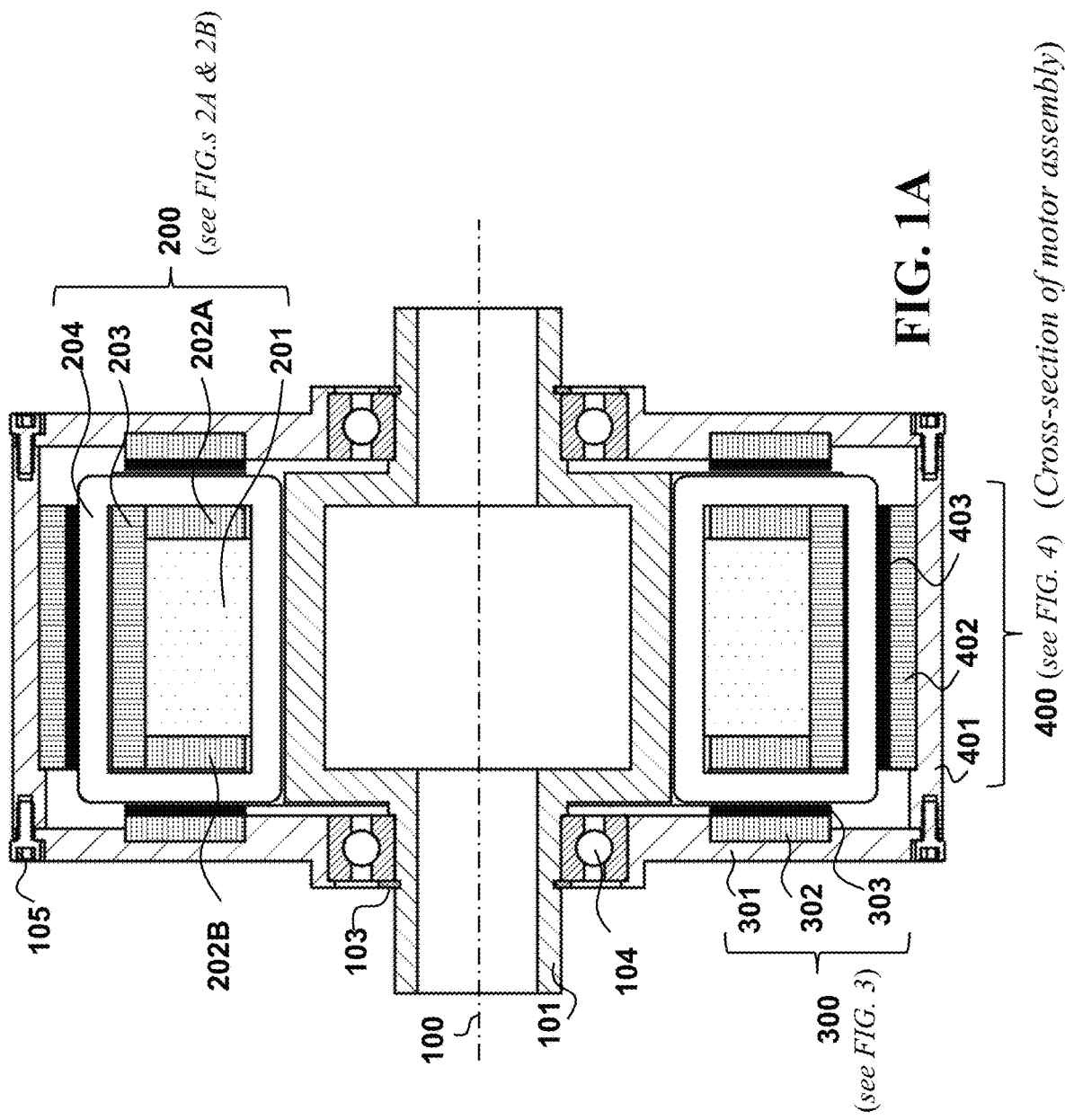
FIG. 1A  (Cross-section of motor assembly)

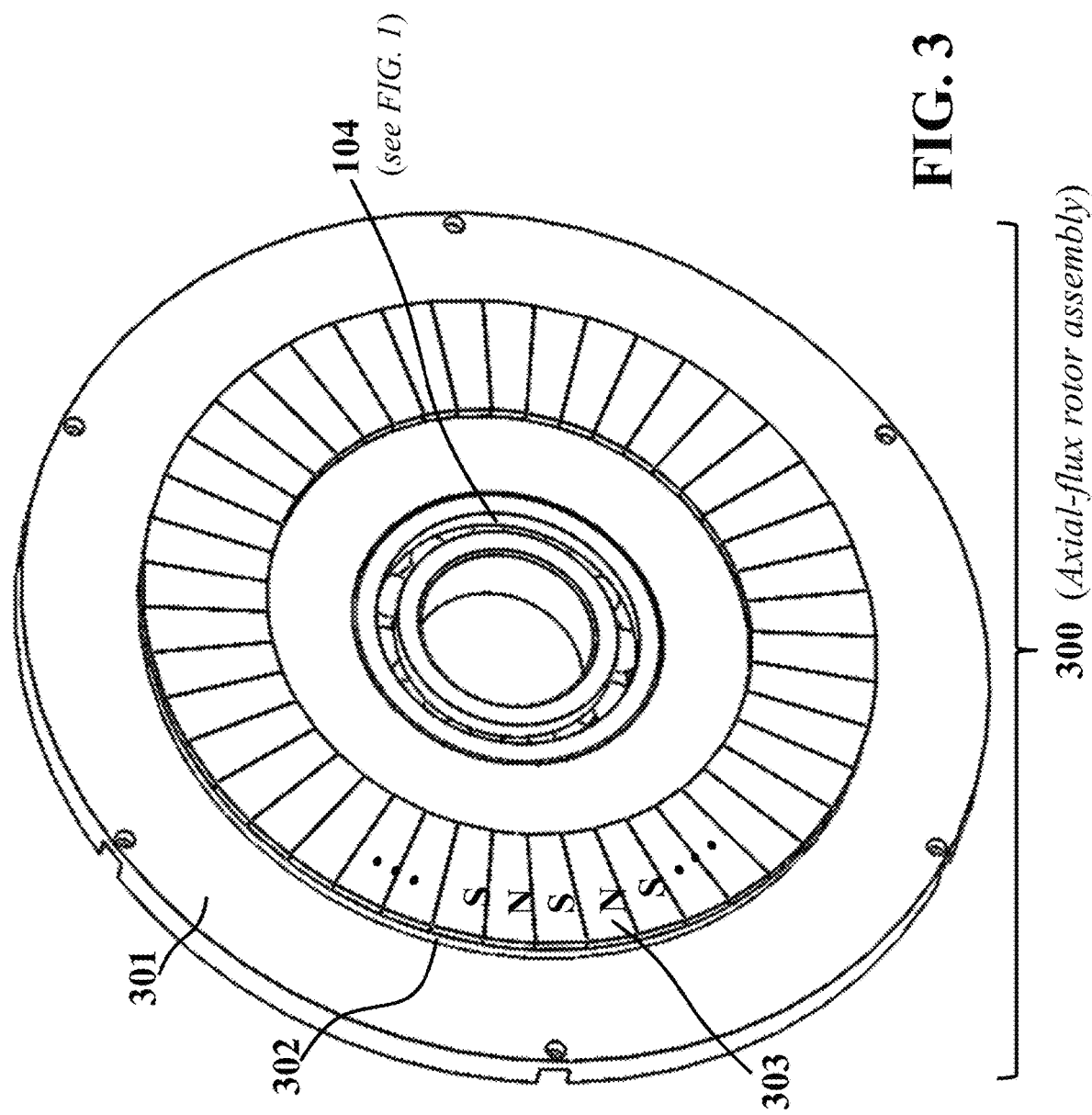

(Type I - Exploded view of Outer Runner Electric Motor Assembly)

Type II - Cross-section of Outer Runner Electric Motor Assembly

MOTOR DESIGNS HAVING SPLINE STRUCTURE CONNECTING MOTOR SHAFT AND STATOR STRUCTURE

TECHNICAL FIELD

The present disclosure relates to motors, and more specifically to motor design including outer runner electric motor designs and combined axial-flux and radial-flux motor designs, with stator assemblies having stator cores with non-ferromagnetic material fixed on shafts via spline-like structures that allow the stator assemblies to utilize electrical laminations which reduce losses and improve torques.

BACKGROUND

Conventional electric motors are one of the most significant energy conversion systems used in industry today. A conventional electric motor is an electric machine that converts electric energy into mechanical energy. Most conventional electric motors operate through interaction between the motor's magnetic field and electric current in a winding to generate a force in the form of rotation of a shaft. For example, over 99% of all the electricity on Earth originates from an electric generator, and roughly two-thirds of that energy goes on to power conventional electric motors. For example, a majority of electric machines use radial flux motor design configurations due to its simplicity, whereas, when torque density is a most important motor design requirement, the types of motor configuration used is an axial flux motor.

As an overview most electric motors require pairing with speed-reducing transmission mechanism (such as a gearbox) when driving the loads for various applications. This is mainly due for two reasons: (a) typically electric machines are most efficient at its rated speed, which is usually a lot higher than the needed speed of the load; and (b) the direct torque output of the electric machines are usually not large enough for the application, and a transmission mechanism is needed to increase for torque.

However, the gearbox typically has nonlinear dynamics such as backlash hysteresis, nonlinear Coulomb friction, which impairs the electric motor's dynamic performance, and is not favorable for precision applications. To that end, in a number of other application areas, such as machine-room-less elevators, robot manipulators, precision rotary stages, and in-wheel drives for electric vehicles, it may be beneficial to eliminate this transmission mechanism, and directly drive the load with the electric motor.

For example, a conventional axial-flux permanent magnet motor designs are utilized for achieving a high torque density targeting the direct-drive motor applications, as noted above. Such designs help to reduce axial length of the motor without loss of torque capability. Some efforts for impoving conventional direct-drive motors have been on surface-mount permanent magnet (PM) motors, since these types of PM motors can have shear stress generation capability among various motor principles.

All electric machines, including the PM motors, can be categorized, according to their flux directions, into axial-flux machines and radial-flux machines. Most electric machines use radial flux due to its simplicity. For radial-flux machines, the magnetic field, or flux in the air gap between rotor and stator, runs radially with respect to the direction of the rotor. For axial-flux machines, the magnetic field, or flux in the air gap between rotor and stator, runs in the direction of the rotor shaft axis. However, for both types of machine designs, there is only part of a surface area along the stator is utilized as an air gap to generate torque One of the important conventional methods to try to improve the motor's torque by increasing an air gap surface area over the rotor's surface. The air gap is a distance between the rotor and stator. When extra torque generation is needed, one effective conventional method to increase the motor's torque is to use a combination of axial-flux and radial-flux for torque generation. In these cases, the air gaps are configured in both axial and radial directions, and the magnetic flux in the stator is three-dimensional.

A permanent magnet synchronous motor, like any rotating electric motor, consists of a rotor and a stator. The stator is a fixed part, and the rotor is a rotating part. Typically, the rotor is located inside the stator of the electric motor. There are also motor designs having structures with rotors located outside of the stator, i.e. inside out or external rotors, which are referenced as outer runner electric motors. Typically, for these types of outer runner electric motors, the rotor consists of permanent magnets consisting of materials with high coercive force for the permanent magnets. The stator consists of an outer frame and a core with windings, which is the most common designs with two-phase and three-phase windings. The principle of operation of a synchronous motor is based on an interaction of a rotating magnetic field of the stator and a constant magnetic field of the rotor. The magnetic field of the rotor is interacting with the synchronous alternating current of the stator windings, according to Ampere's Law, which creates torque, forcing the rotor to rotate.

Accordingly, there is a need for new motor design configurations including combined axial-flux and radial-flux motor designs and outer runner electric motor designs, to improve torque generation and reduce losses for motors including direct drive motor applications without a need for a gearing box, and allow for use of electrical liminations.

SUMMARY

The present disclosure relates to motors, and more specifically to motor design including outer runner electric motor designs and combined axial-flux and radial-flux motor designs, with stator assemblies having stator cores with non-ferromagnetic material fixed on shafts via spline-like structures that allow the stator assemblies to utilize electrical laminations which reduce losses and improve torques.

Some embodiments include new motor designs incorporating a spline-like structure to attach the stator assembly on a stationary rotor shaft, and replacing the stator core center conventional soft magnetic composite (SMC) or ferrite materials with a non-ferromagnetic material, i.e. plastic or fiberglass, for types of motors including combined axial-flux and radial-flux motors and out-runner motors.

For example, an embodiment can be configured to include an axial-flux and radial-flux motor with a rotor mounted rotatably about a machine axis with the rotor rotatively attached to a stationary shaft. A stator assembly can be structured to have some non-ferromagnetic material within the stator core, and a radial-flux stator yoke with a continuous inner wall rigidly attached on a continuous outer wall of the stator core. A first axial-flux stator yoke with an inner wall rigidly attached on an outer surface of a first edge wall of the stator core, and a second axial-flux stator yoke having an inner wall rigidly attached on an outer surface of a second edge wall of the stator core. Wherein the radial-flux stator yoke and the first and the second axial-flux stator yokes, each include laminated sheets and slots. Also, windings can be positioned in the slots of the radial-flux stator yoke and the first and the second axial-flux stator yokes. Wherein the stator core and the shaft include a spline coupling feature adapted to selectively couple and mate the shaft to the stator assembly.

Another embodiment can include an outer runner motor having a rotor mounted rotatably about a machine axis, with the rotor rotatively attached to a shaft. A stator assembly having a stator core with a non-ferromagnetic material. An axial-flux yoke with an inner wall rigidly attached on an outer surface of a first edge wall of the stator core, or a radial-flux yoke with a continuous inner wall rigidly attached on a continuous outer wall of the stator core. Wherein the axial-flux yoke and the radial-flux yoke, each include laminated sheets and slots. Windings can be positioned in the slots of either the axial-flux stator yoke or the radial-flux stator yoke. Wherein the stator core and the shaft include a spline coupling feature adapted to selectively couple and mate the stator core to the shaft.

Spline-Like Structure

Contemplated for both of the above embodiments is that the spline coupling feature can include the stator core configured with an external spline structure having teeth on an inner surface of an inner wall of the stator core that engage with the shaft which includes a corresponding internal spline structure with grooves on an outer surface of the shaft, so that the stator core is attached to the shaft, of which the rotor rotates around the same shaft, in order to transmit a torque action to produce a torque force.

In order to incorporate the spline-like structure into the stator core and the stationary rotor shaft, required a complex analysis of coordinating each structural aspect of the spline-like structure with other motor factors of the motor, so all the aspects of the motor are configured to achieve a desired operational performance. For example, each structural aspect of the spline-like structure includes an associated characteristic which both need to be evaluated and coordinated with the other motor factors and their associated characteristics, for the motor to operate as designed. Some of the structural aspects of the spline-like structure and their associated characteristics can include:

(1) Determining a size of each tooth (Aspect)? For example, some structural aspects that needed to be determined include an amount of tooth height, an amount of tooth width and an amount of tooth depth. These structural aspects of the teeth need to be designed according to the intended designed operational performance of the motor. For example, if the tooth height were too long and not coordinated with the estimated torque output as for the other components of the motor, the tooth is likely to break or have a reduced operational life when the intended designed torque output results in being too large for that specific tooth height to withstand. Thus, the characteristic for that specific tooth height is that the tooth is likely to fail or have a reduced operational life, which in either scenario cause the motor to fail. Which means that identifying and designing each specific tooth structural aspect in terms of an intended designed operational performance is necessary for the motor to operate as intended.

(2) Determining a number of teeth for the spline-like structure? For example, the number of teeth may depend on an amount of how much current can be generated by the motor, such that if not enough current is generated due to too many teeth or to less teeth, then there will be a lower an amount of torque output, which will not attain an intended motor design operational performance.

(3) Determine a tooth angle and an angle space or spacing between teeth? The tooth angle can be of 360 degree divided by the number of teeth. The angle space or spacing between teeth should be equal to each other.

(4) Determine a thermal factor for each tooth along with a thermal factor for all the teeth of the spline-like structure? For example, all the structural aspects of the tooth need to be evaluated in terms of a thermal factor, so the motor can achieve the intended designed operational performance. If the specific structural aspects making up a specific tooth configuration has a too low thermal factor, then that specific tooth configuration characteristic(s) is that of eventually failing or having a reduced operational life, due to being exposed to an amount of heat above that which it is the rated thermal factor, among other reasons, such as flow rate and temperature of cooling medium.

(5) Identify what will be a torque amount for each tooth and/or the combined teeth of the spline-like structure? For example, the motor design in terms of knowing an estimated amount of intended torque generation needs to be considered when constructing the teeth of the spline structure, so the teeth can be designed to withstand the intended estimated torque out, so the teeth do not break/fail or have a reduced operational life.

For the new motor designs to operate as intended the above structural aspects of the spline-like structure with the other motor factors of the motor (see below, next section), need to be designed individually according to the intended designed operational performance for the motor operate as intended.

Non-Ferromagnetic Material Stator Cores

Discovering to replace a center of the stator core with a new material was realized from experimentation. For example, it was realized from testing that a portion of a conventional stator core SMC material was not being utilized by the motor in terms of the motor's operational performance, among other aspects. What was realized that by replacing the conventional stator core SMC material with non-ferromagnetic materials, resulted in delivering an increased amount of a motor's total torque output, for these types of motors, i.e. combined axial- and radial-flux motors and out-runner motors, when compared to an amount of a motor's total torque output to conventional motor types that have stator cores with the SMC materials, of the same motor size. This realization went against all conventional designs and conventional thinking for conventional designers of these types of motors, since these conventional combined axial-flux and radial-flux motor and out runner designs were specifically designed to achieve an increase in torque density over other types of conventional motor designs. For example, the conventional combined axial-flux and radial-flux motor designs have air gaps configured on both axial-direction and radial-direction, and the magnetic flux in the stator is three-dimensional. The conventional stator cores made with SMC material were used for obtaining low bulk conductivity, since eddy currents are generated in all directions. However, what was later discovered is that there were some negative effects with conventional stator cores made with SMC material for these types of conventional motor designs which resulted in these types of motor design not being able to utilize conventional electrical laminations.

Other negative aspects of these types of conventional motor designs had structure configurations that had separated stators surrounding the rotor, which resulted in a lower specific torque due to the use of having a solid rotor.

What was later discovered was that by replacing the conventional stator SMC material for these types of motors with the non-ferromagnetic materials such as plastic or fiberglass, allowed for utilizing the conventional electrical laminations for manufacturing the stators. This discovery led to the realization to develop a new motor design having separate axial-flux and radial-flux stators made of conventional electric laminations that could later be assembled together. This unique stator design having a center of the stator core with non-ferromagnetic materials, reduced the stator core's manufacturing cost due to using the conventional electrical laminations. Also realized is that using the conventional electrical laminations allowed for a higher torque output due to having a higher material permeability, and which further lowered an amount of the motor's hysteresis loss. Thus, some other aspects learned from experimentation was that this novel stator design also allowed for an improved level of an amount of the motor specific torque output. Because the stator core included the non-ferromagnetic materials, the overall weight of the stator assembly was reduced which improved a torque-to-mass ratio of the motor. Some other embodiments with this innovative stator core non-ferromagnetic material, are configured to include one or a combination of features such as an out-runner motor configuration, toroidal windings for the stator, or both.

Just like the aspects of incorporating the spline-like structure into some new motor designs, replacing the conventional stator core SMC materials with non-ferromagnetic materials also required a complex analysis of coordinating the stator core with non-ferromagnetic materials with the other motor factors of the motor, in order to be able achieve a desired operational performance. For example, in developing the new motor designs of the present disclosure, the new stator core material needed to be coordinated with all the other motor factors and their associated characteristics, i.e. including the spline-like structure. Some of the aspects of new stator core and their associated characteristic can include:

(1) What is the number of slots? Based upon experimentation, the number of slots should be the same as that of the number of stator slots (in some motor design cases, the number of slots is 24).

(2) What is an angle space for each slot? Learned from experimentation was that each slot can take on a different angle space, wherein an angle space or spacing for each slot can be 360 degrees divided by the number of slots, which calculates to 15 degrees. Wherein each slot can take on a same angle space.

(3) What is a size of the slot in terms of an amount of height, an amount of width and an amount of depth, to generate an amount of intended torque, i.e. more current translated to getting more torque? For example, a height of slot is equal to a length of stator minus two times of axial-flux stator thickness. A width of the slot is the same as that of radial-flux stator slot, and the height is 1.5 times of that of radial-flux stator slot. More current, results in producing more overall torque for the motor.

(4) What is the thermal factor? For example, if there are too many slots than the result can be generating to much heat, which will eventfully lead to overheating the motor. Thus, a thermal factor of the stator core material that is selected, needs to be as high as possible in order to cool or dissipate as much heat as possible. Then, the determined the thermal factor may be combined with an associated cooling structure, in order to avoid overheating the motor.

(5) What is the intended torque amount? For example, if a depth of the slots happens to be too shallow, then the spline structure teeth may not be able to withstand the generated torque, which would result in the teeth breaking. Based on experimentation the torque can be in a range of 150-250 Nm, which is within a torque range that the width of tooth of the spline structure is strong enough for the torque and would not break the teeth of the spline structure.

(6) What is going to be a number of windings? For example, if the number of winding is not enough windings, then at least one resulting effect is a decrease performance of the motor, i.e. loss of intended torque. Basically, at least one effect can be that the motor is not strong enough to start itself, the magnetic field, nor relative motion reverse of the polarity of an input voltage to either the rotor or stator windings, but not both, can occur. Another example can be what if there are too many windings, then what? The number of turns may depend, by-non-limiting example, on a first primary winding compared to a second winding, the second winding may depend on a number of a third winding, all of which can be based on equations related to voltage of the primary winding in view of the secondary winding, and so on, etc. Thus, determining the number of windings depends on the other factors of the specific motor type and configuration. According to at least one embodiment of the present disclosure, a number of windings will be the same as the number of stator slots, if not enough windings, less intended torque will be produced. If too much windings, there is no room for placing them within the intended new motor design.

(7) What is the material(s) type of the stator yoke(s)? Some embodiments of the present disclosure have stator cores with non-magnetic cores, wherein a list of materials can include, by-non-limiting example: solid non-magnetic steel, resin, air, ceramics, titanium, glass fiber, carbon fiber, somaloy 1000 3P, somaly 130i 5P. Wherein the list of yoke materials other than, laminated sheets, can be a solid material or at least one power material, formulated into, or formulating, an axial-flux yoke and an radial-flux yoke.

For the new motor designs to operate as intended the above structural aspects of the new stator core with the non-ferromagnetic materials along with the other motor factors of the motor, need to be designed individually according to their respective intended designed operational performance, for the motor achieve the designed operational performance levels.

Spline-Like Structure Advantages and Practical Applications

Upon completing the complex analysis of coordinating the new stator core material(s) and spline-like structure, these new motor designs underwent several test experimentations that resulted in other discoveries and realizations. For example, what was later discovered is that the stator assembly with the spline-like structure offered an increased level of tolerances to stator stresses that resulted in performance features of a longer fatigue life and an increase in an amount of tolerances to shield against wear and tear, when compared to conventional motors of the same size and type with the stator assembly press fit or glued via adhesives to the rotor shaft, under similar testing.

Experimentation showed an increase level of tolerances when the motor was reaching upper design limitations or capabilities of the system, such as showing: (1) an increased level of variance of strength of drive, which was believed due to the spline structure being connected the rotor shaft that resulted in the motor tolerating a larger overall amount of torque generation; and (2) an increased amount of rotational transmission concentration, which is also believed due to the spline-like structure being attached to the rotor shaft that resulted in increasing an amount of the motor's thrust force generation area over the rotor, which in turn resulted in increasing an amount of the motor's torque density.

Some reasons these performance features and results are significant to the motor industry is that the embodiments of the present disclosure provide increased tolerances that shield against wear and tear, which translates to extending the life of the motor. This is especially important in view of motor industry making large investments in condition monitoring of electric machines and looking for new alternative diagnosis in the detection of faults to reduce operating costs, enhance reliability of the motor operation along with improving service to customers.

Non-Ferromagnetic Material Stator Cores Advantages and Practical Applications During these test experimentations with the new motor designs with non-ferromagnetic material stator cores, other discoveries and realizations were identified when compared to a conventional motor of the same size and type. For example, some advantages that was later discovered is an increase in an amount of torque generation area over a rotor's surface (i.e. a surface area between rotor and stator that can generate torque), when compared to an amount of torque generation area over the rotor's surface for the conventional combined axial-flux and radial-flux motor of the same size. At least one practical application of this advantage over conventional motors of the same size and type can be a surface-mounted/interior permenant magnet motors.

Another realization was that a motor's total weight was effectively reduced, and therefore improved the motor's torque-to-mass ratio, when compared to similar conventional motor designs of the same size. This was due to non-ferromagnetic materials having a much lower density than ferromagnetic materials, and by replacing the ferromagnetic material of a same volume with a lighter non-ferromagnetic material, reduced the amount of an overall mass of the motor. At least one practical application of this advantage over conventional motors of the same size and type can be a squirrel-cage/wound rotor induction motors.

Still another realization included an approximate constant shear stress generation in air gaps, that increased an amount of torque generation area without increasing a motor's overall cubic area/size, i.e. motor's total volume, which resulted in effectively improving an amount of a motor's torque density, when compared to an amount of torque generation area of a conventional same size motor's total volume of a same type of conventional motor of the same size. Some of the practical applications of the new motor designs over that of conventional motors of the same size and type can be a surface-mounted/interior permenant magnet motors.

Still another discovery of some advantages for the toroidal winding feature specific to the winding wrapped around the core forming the toroid-shaped stator assembly, is a reduced amount of length of end turns, which in turn helped reduce a motor's copper loss, and thus improved an amount of a motor's overall efficiency, at least when compared with similar type conventional motors of the same size. Another aspect discovered was an increase in an amount of a motor's flexible design to optimize an amount of torque density and/or an amount of specific torque, when compared to an amount of a conventional motor's flexible design to a same size conventional motor using a core with soft magnetic composite (SMC) or ferrite material. As noted above, all of the mentioned advantages were based on comparing each above stated advantage to a similar conventional motor or similar types of conventional motors of a same size associated with each above respective advantage.

According to an embodiment of the present disclosure, an electrical machine that is an axial-flux and radial-flux motor including a rotor mounted rotatably about a machine axis, with the rotor rotatively attached to a shaft. A stator assembly having a stator core with a non-ferromagnetic material. A radial-flux stator yoke having a continuous inner wall rigidly attached on a continuous outer wall of the stator core. A first axial-flux stator yoke with an inner wall rigidly attached on an outer surface of a first edge wall of the stator core; A second axial-flux stator yoke having an inner wall rigidly attached on an outer surface of a second edge wall of the stator core. Wherein the radial-flux stator yoke and the first and the second axial-flux stator yokes, each include laminated sheets and slots. Windings are positioned in the slots of the radial-flux stator yoke and the first and the second axial-flux stator yokes. Wherein the stator core and the shaft include a spline coupling feature adapted to selectively couple and mate the stator core to the shaft.

According to another embodiment of the present disclosure, an electrical machine that is an outer runner motor having a rotor mounted rotatably about a machine axis, with the rotor rotatively attached to a shaft. A stator assembly having a stator core with a non-ferromagnetic material. An axial-flux yoke with an inner wall rigidly attached on an outer surface of a first edge wall of the stator core, or a radial-flux yoke with a continuous inner wall rigidly attached on a continuous outer wall of the stator core. Wherein the axial-flux yoke and the radial-flux yoke, each include laminated sheets and slots. Windings can be positioned in the slots of either the axial-flux stator yoke or the radial-flux stator yoke. Wherein the stator core and the shaft include a spline coupling feature adapted to selectively couple and mate the stator core to the shaft.

Another embodiment of the present disclosure a system including a transceiver to receive signals from sensors associated with an axial-flux and radial-flux (AFARF) motor. A digital controller configured to receive the signals and generate control signals specifying values of one or combination of a multi-phase voltage and a current for the AFARF motor, for tracking a reference trajectory of torques of the AFARF motor. Wherein the AFARF motor has a load positioned by the AFARF motor and is controllable by the digital controller. Such that the AFARF motor includes a rotor mounted rotatably about a machine axis, with the rotor rotatively attached to a shaft. A stator assembly having a stator core with a non-ferromagnetic material. A radial-flux stator yoke having a continuous inner wall rigidly attached on a continuous outer wall of the stator core. A first axial-flux stator yoke with an inner wall rigidly attached on an outer surface of a first edge wall of the stator core; A second axial-flux stator yoke having an inner wall rigidly attached on an outer surface of a second edge wall of the stator core. Wherein the radial-flux stator yoke and the first and the second axial-flux stator yokes, each include laminated sheets and slots. Windings are positioned in the slots of the radial-flux stator yoke and the first and the second axial-flux stator yokes. Wherein the stator core and the shaft include a spline coupling feature adapted to selectively couple and mate the shaft to the stator assembly.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 1A is a schematic diagram illustrating a cross-section view of a motor, according to an embodiment of the present disclosure;

FIG. 3 is a schematic illustrating an axial-flux rotor assembly, according to some embodiments of the present disclosure;

FIG. 9A illustrates a Type I motor, and FIG. 9B illustrates a Type II motor, according to some embodiments of the present disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The present disclosure relates generally to motors, and more specifically to a motor configuration with a combined axial-flux and radial-flux that uses separate electrical-lamination-made stator cores for the axial-flux and radial-flux that reduces loss and improves torque.

FIG. 1A is a schematic diagram illustrating a cross-section view of a motor, according to an embodiment of the present disclosure. The motor design of the present disclosure includes a combined axial-flux and radial-flux design for torque generation, that can be applied with direct-drive applications.

Figure 1B:
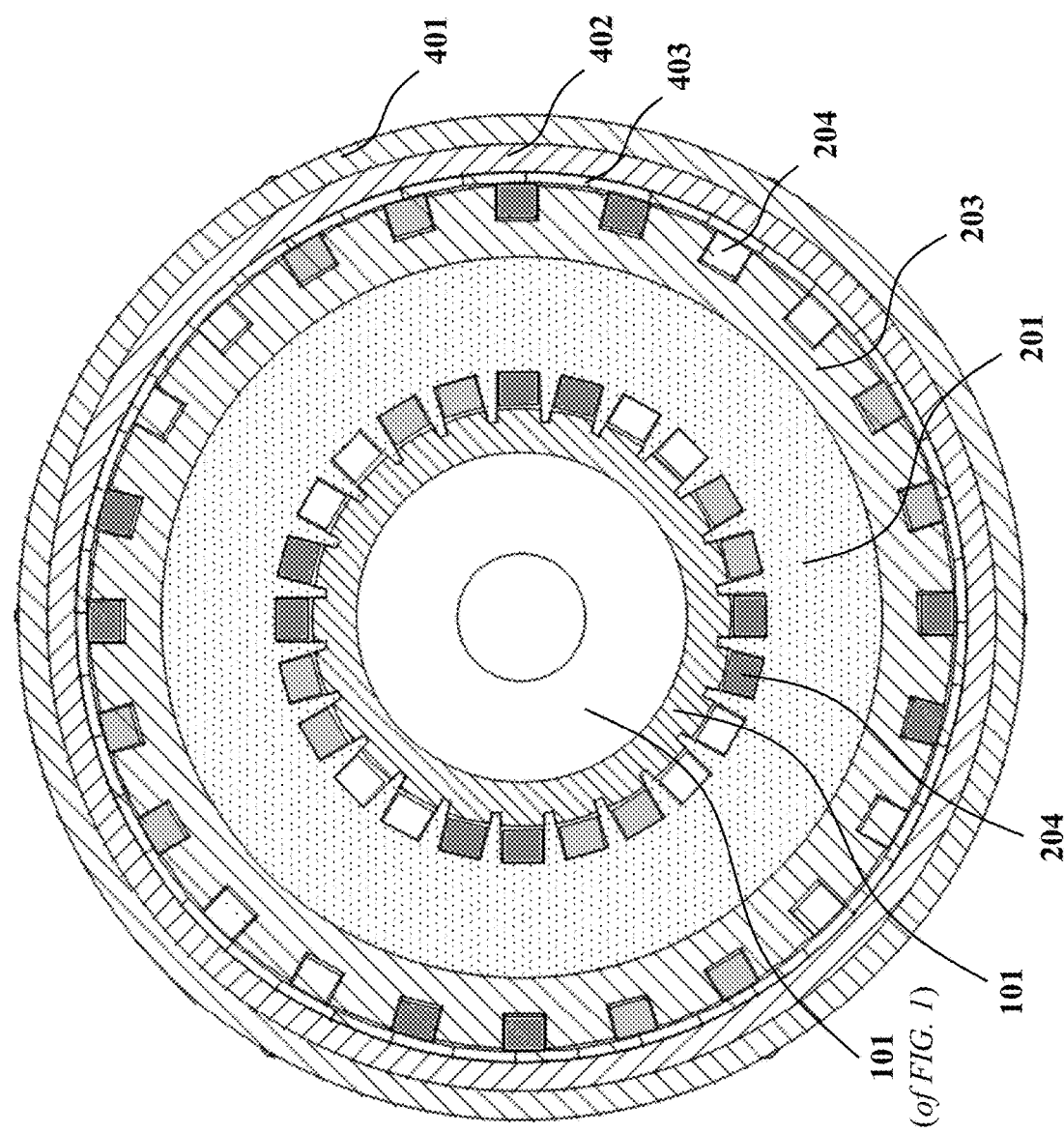
FIG. 1B is a schematic illustrating a stator core external spline structure engaged with a corresponding internal spline structure, according to some embodiments of the present disclosure.

FIG. 1B is a schematic illustrating a stator core 201 external spline structure engaged with a corresponding internal spline structure, according to some embodiments of the present disclosure. For example, FIG. 1B shows that the lower part of stator toroidal windings can pass through the slots of the non-magnetic stator core 201.

Referring to FIG. 1A and FIG. 1B, a shaft 101 is a stationary motor shaft 101, and line 100 of FIG. 1A is a rotational axis of a rotor. A stator assembly 200 (see FIG. 2A & FIG. 2B for more detail) is in a center of the whole machine and the stator assembly 200 is fixed on the shaft 101. Wherein the stationary motor shaft 101 can be a hollow stationary motor shaft (see 599 of FIG. 5). The stationary motor shaft 101 can have an internal surface in the stationary shaft 101 that can be used as a cooling channel, where cooling liquid can run through and take away the heat generated in the motor. Each stator assembly 200 can include at least one fixture core 201 made of non-ferromagnetic material, two axial-flux stator yokes 202A, 202B, one radial-flux stator yoke 203, and a set of stator winding 204.

Two axial-flux rotor assembly 300 and one radial-flux rotor assembly 400 are configured surrounding the stator assembly 200 and are free to rotate about the rotational axis 100. Here, each axial-flux rotor assembly 300 consists of one axial-flux rotor housing 301, one axial-flux rotor back-iron 302, and one axial-flux permanent magnet (PM) array 303. The radial-flux rotor assembly 400 consists of one radial-flux rotor housing 401, one radial-flux rotor back-iron 402, and one radial-flux PM array 403. The two rotor assemblies 300 and 400 are rigidly connected via screw fasteners 105 and are supported by bearings 104. The axial position of the bearings 103 are determined by retaining rings 103.

Figure 2A:
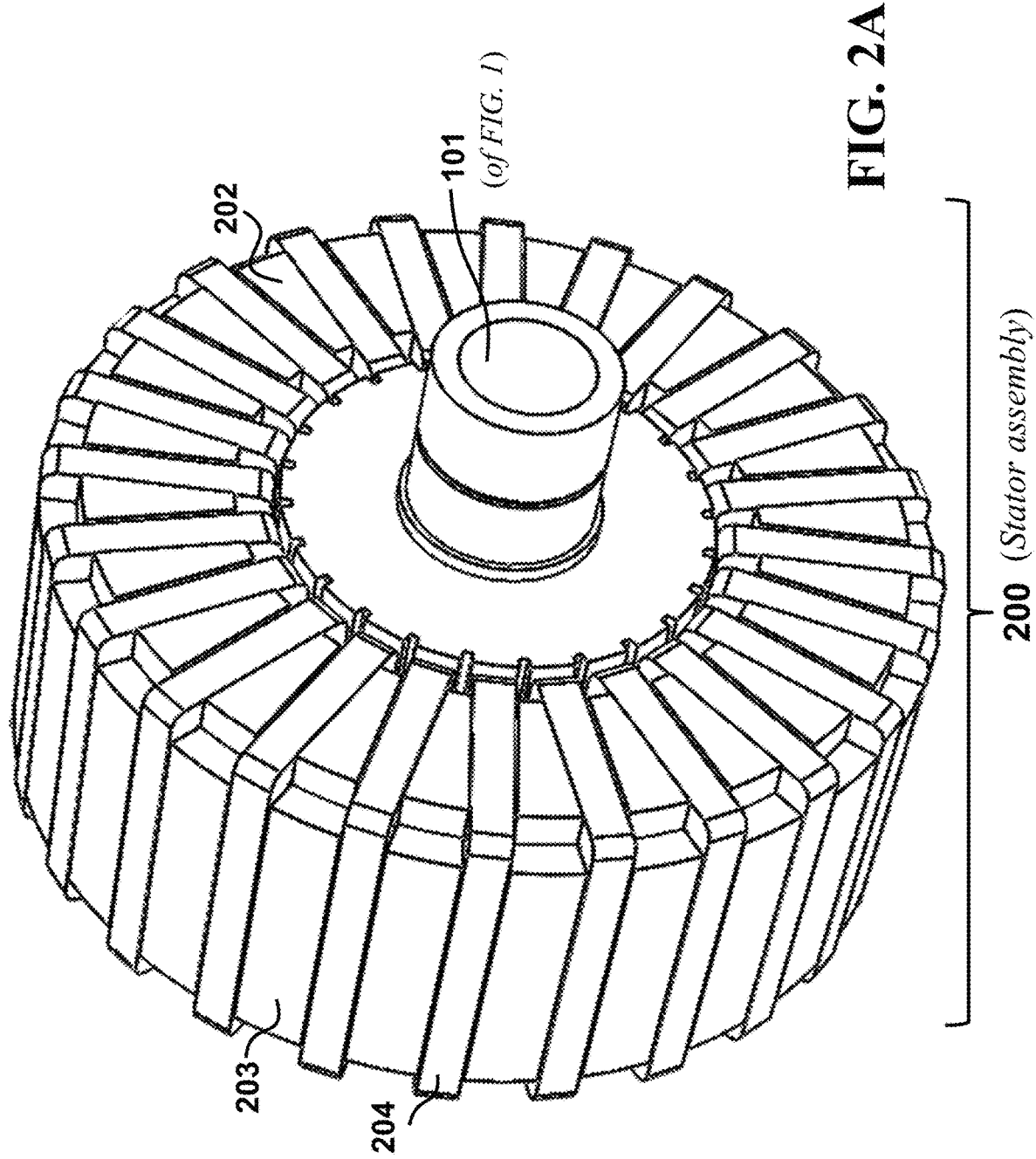
FIG. 2A is a schematic illustrating a motor stator assembly including an isometric view of the motor stator assembly, according to some embodiments of the present disclosure.

FIG. 2A is a schematic illustrating a motor stator assembly including an isometric view of the motor stator assembly, according to some embodiments of the present disclosure.

Figure 2B:
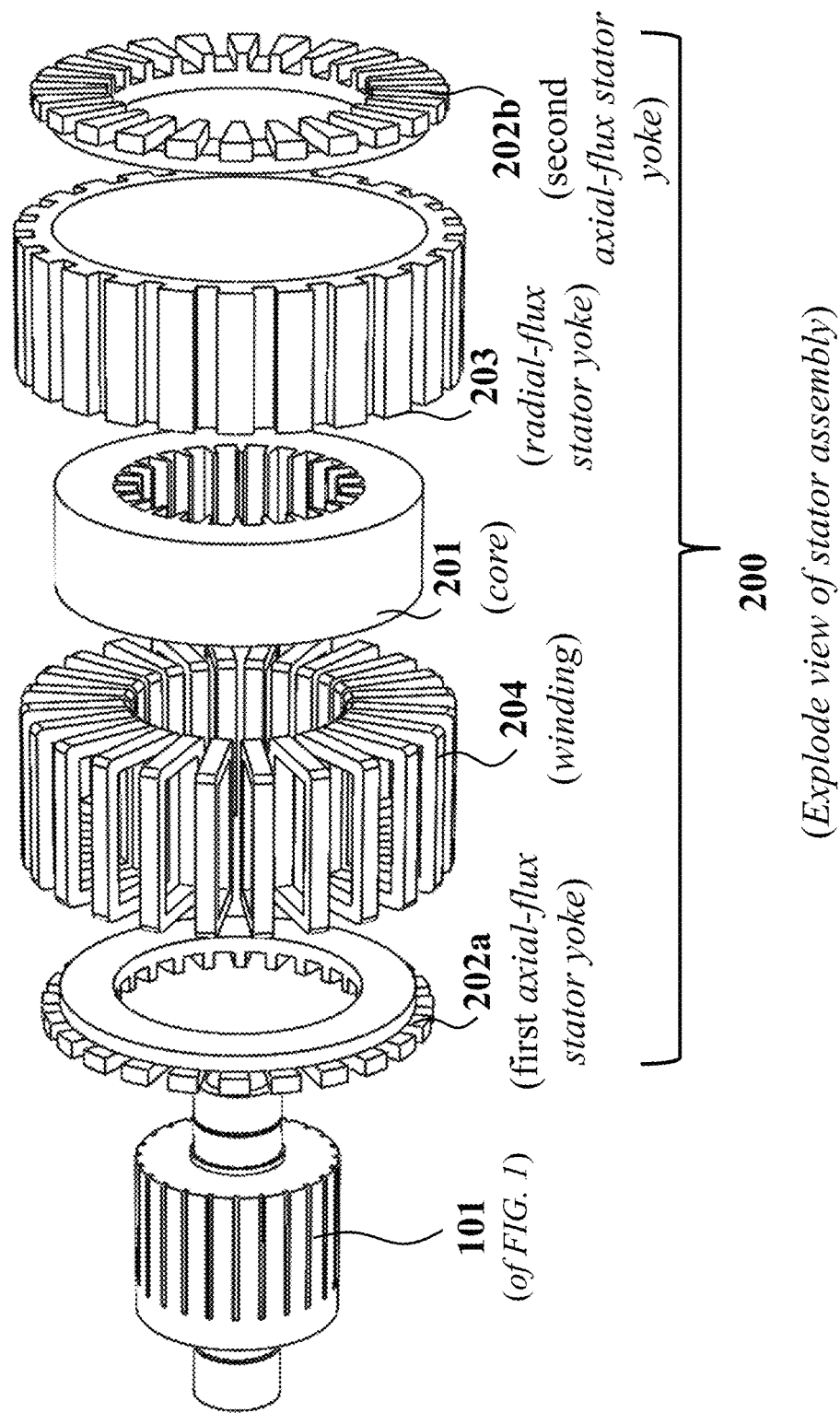
FIG. 2B is a schematic illustrating the motor stator assembly of FIG. 2A including an exploded view of the motor stator assembly, according to some embodiments of the present disclosure.

FIG. 2B is a schematic illustrating the motor stator assembly of FIG. 2A including an exploded view of the motor stator assembly, according to some embodiments of the present disclosure.

Referring to FIG. 2A and FIG. 2B, the fixture core or at least one core 201 is made of non-ferromagnetic material with low conductivity, for example fiberglass. It has slots on the inner-diameter surface. One radial-flux stator yoke 203 and two axial-flux stator yokes 202a and 202b are rigidly attached on the fixture core 201 via structural bonding adhesive. The axial-flux stator yoke 202 is made of spiral electrical lamination, where the laminated direction is in the radial direction. The axial-flux stator yoke 202 can be fabricated by making the disk-shaped spiral and then slots are cut via electrical discharge machining (EDM). One radial-flux stator yoke 203 is made of electrical lamination stacks, and the lamination direction is in the axial direction. The stator winding 204 is finally wound surrounding the assembled stator yoke (including 201, 202, and 203) in the slots. The stator winding 204 is made of multiple loops of magnetic copper wires, and are having three-phases and a pole pair number Ps. Finally, the stator assembly 200 is attached onto the shaft 101 and is rigidly connected via a spline, where the teeth on the inner surface of 201 are engaging with the slots on the surface of the shaft 101. In this way, the stator assembly 200 can be fixed on the shaft and large torque can be transmitted.

Figure 2C:
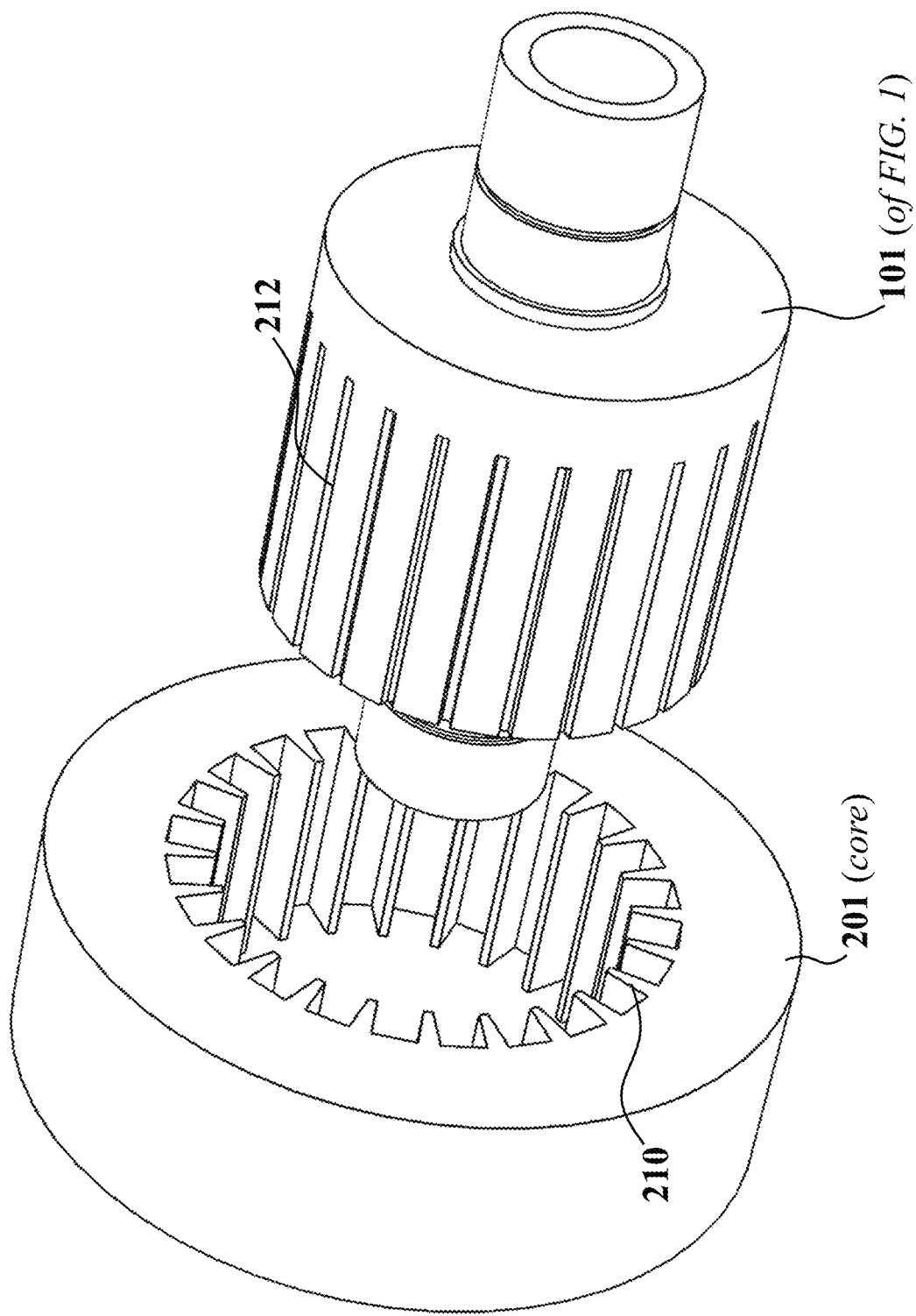
FIG. 2C is a schematic illustrating a stator core external spline structure having teeth on an inner surface of the stator core that engages with a corresponding internal spline structure that has grooves on an outer surface of the shaft, according to some embodiments of the present disclosure.

FIG. 2C is a schematic illustrating a stator core 201 external spline structure 210 having teeth on an inner surface of the stator core 201 that engages with a corresponding internal spline structure that has grooves 212 on an outer surface of the shaft 101, so that the stator core 201 is attached to the shaft 201, of which the rotor rotates around the same shaft 201, in order to transmit a torque action to produce a torque force, according to some embodiments of the present disclosure.

FIG. 3 is a schematic illustrating an axial-flux rotor assembly, according to some embodiments of the present disclosure. For example, FIG. 3 shows the axial-flux rotor assembly 300 for the motor of the present disclosure, that can include one axial-flux rotor housing 301, one axial-flux rotor back-iron 302, and one axial-flux PM array 303. The axial-flux rotor backiron is made of spiral electrical lamination, where the laminated direction is in the radial direction. The axial-flux PM array 303 consists of 2Pr pieces of arc-shaped magnets with alternating polarity, where Pr is the number of rotor pole pair. The magnets are rigidly attached on axial-flux rotor backiron 302 via structural adhesive. The axial-flux rotor housing 301 can be made of structural aluminum alloy. The assembled 302 and 303 are fixed on the axial-flux rotor housing 301 also via structural adhesive.

Figure 4:
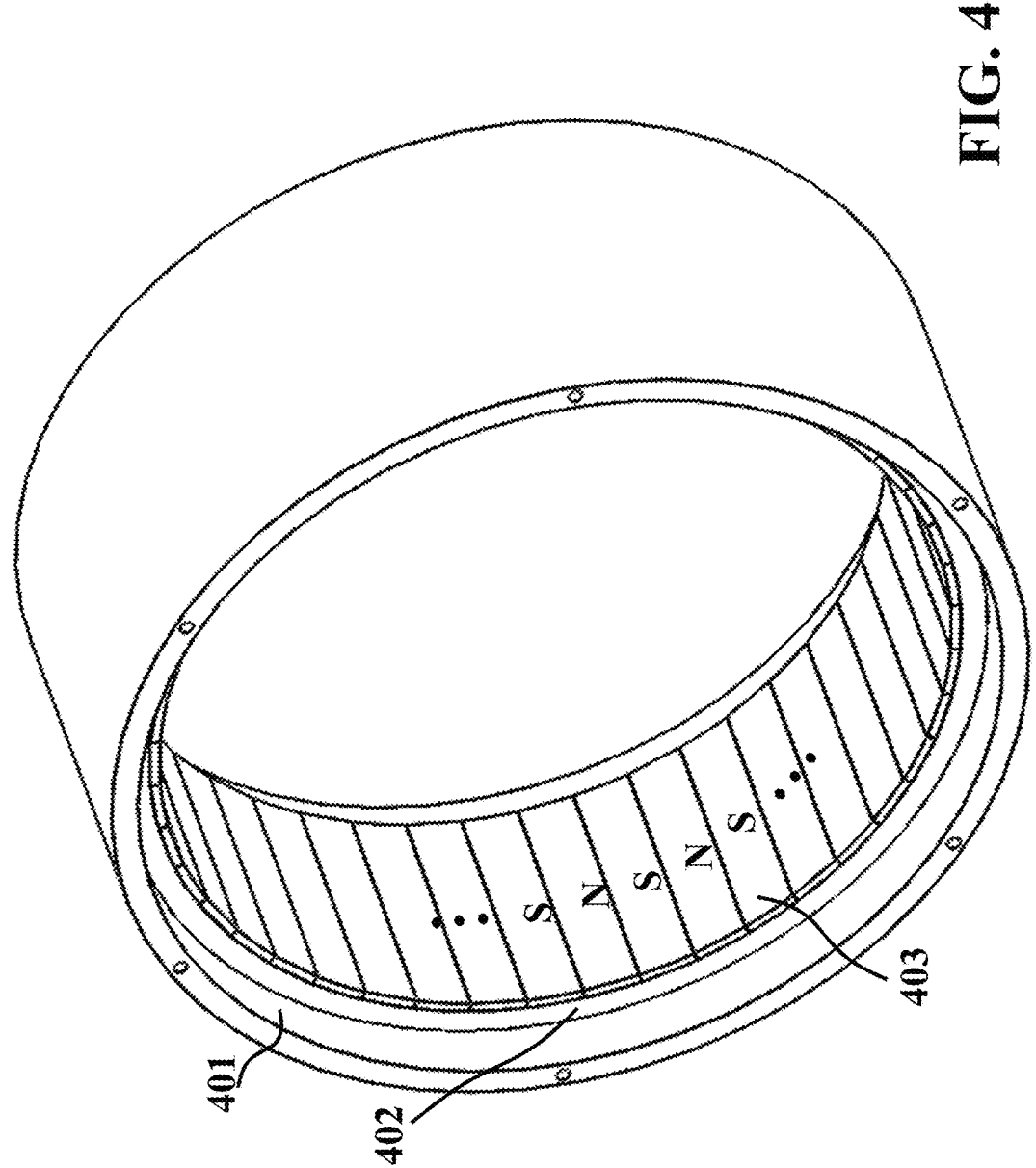
FIG. 4 is a schematic illustrating an radial-flux rotor assembly, according to some embodiments of the present disclosure.

FIG. 4 is a schematic illustrating an radial-flux rotor assembly, according to some embodiments of the present disclosure. For example, FIG. 4 shows the radial-flux rotor assembly 400 for a motor of the present disclosure, which that can include one radial-flux rotor housing 401, one radial-flux rotor backiron 402, and one radial-flux PM array 403. The radial-flux rotor backiron can be made of a stack of electrical lamination pieces, where the laminated direction can be in an axial direction. The radial-flux PM array 403 also can include of 2Pr pieces of arc-shaped magnets with alternating polarity. The magnets are rigidly attached on radial-flux rotor backiron 402 via structural adhesive. The radial-flux rotor housing 301 can be made of structural aluminum alloy, and taped holes are arranged on the axial-directional surfaces. Finally the assembled 402 and 403 are fixed to the radial-flux rotor housing 301 via press-fitting.

When exciting the stator coils with three-phase currents, the stator generates an rotating magnetic field, which integeracts with the rotor magnetic field and thus generate a torque to the rotor, which can accelerate the rotor or drive loads. When the motor design is having $$P_r = P_s, \quad (1)$$

the motor forms a regular surface-mount permanent magnet synchronous motor (PMSM).

When the motor parameters have relationship $$P_r = Z_s \pm P_s, \quad (2)$$

where Zs is the number of stator slots in 202 and 203, the motor forms a vernier permanent magnet motor (VPM), where both the fundamental harmonic air gap flux and the stator teeth harmonic air gap flux are involved in the torque generation. This motor is utilizing the magnetic gearing effect and thus enable larger torque generation comparing with the regular PMSM. The motor topology in this invention can be used in both regular PMSM and VPM motors.

Figure 5:
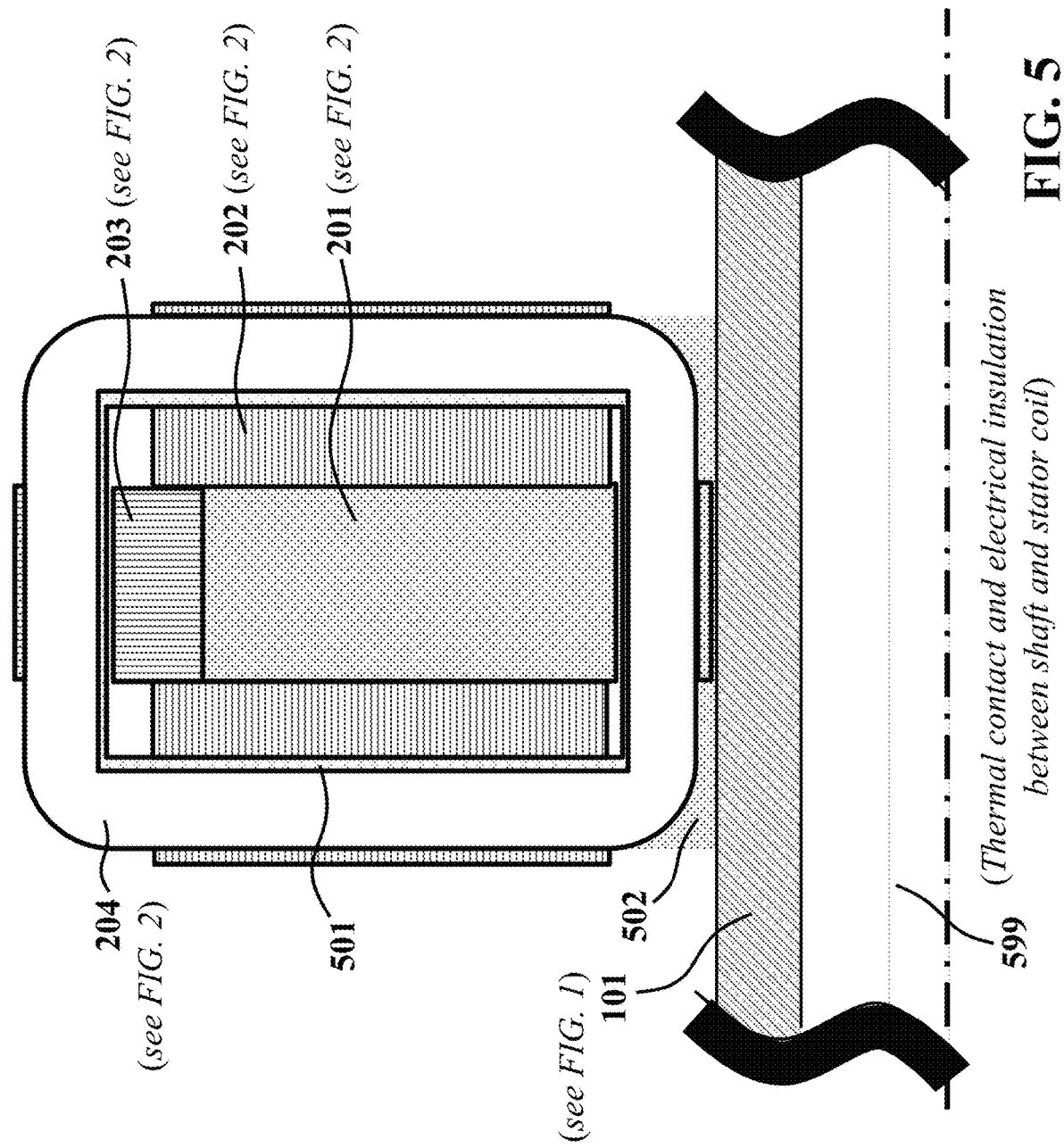
FIG. 5 is a schematic illustrating a thermal connection between motor stator assembly and a hollow shaft for cooling, according to some embodiments of the present disclosure.

FIG. 5 is a schematic illustrating a thermal connection between motor stator assembly and a hollow shaft for cooling, according to some embodiments of the present disclosure. For example, FIG. 5 shows the stator coils 204 are wrapping around the assembled stator yoke 201, 202 and 203 inside the slots. A thin layer of electrical insulator 501 is configured in between the stator yoke 201 and the stator coil 202. The insulator 501 can be made of polymide film or other standard slot insulation material for electric machines. After the stator assemblies are well positioned on the shaft, the stator coils 202 are in contact with the shaft 101 via a thermally conductive yet electrically insulating epoxy 502. This epoxy layer 502 can effectively conduct the heat from the coils into the shaft, and further into the cooling channels 599.

Figure 6:
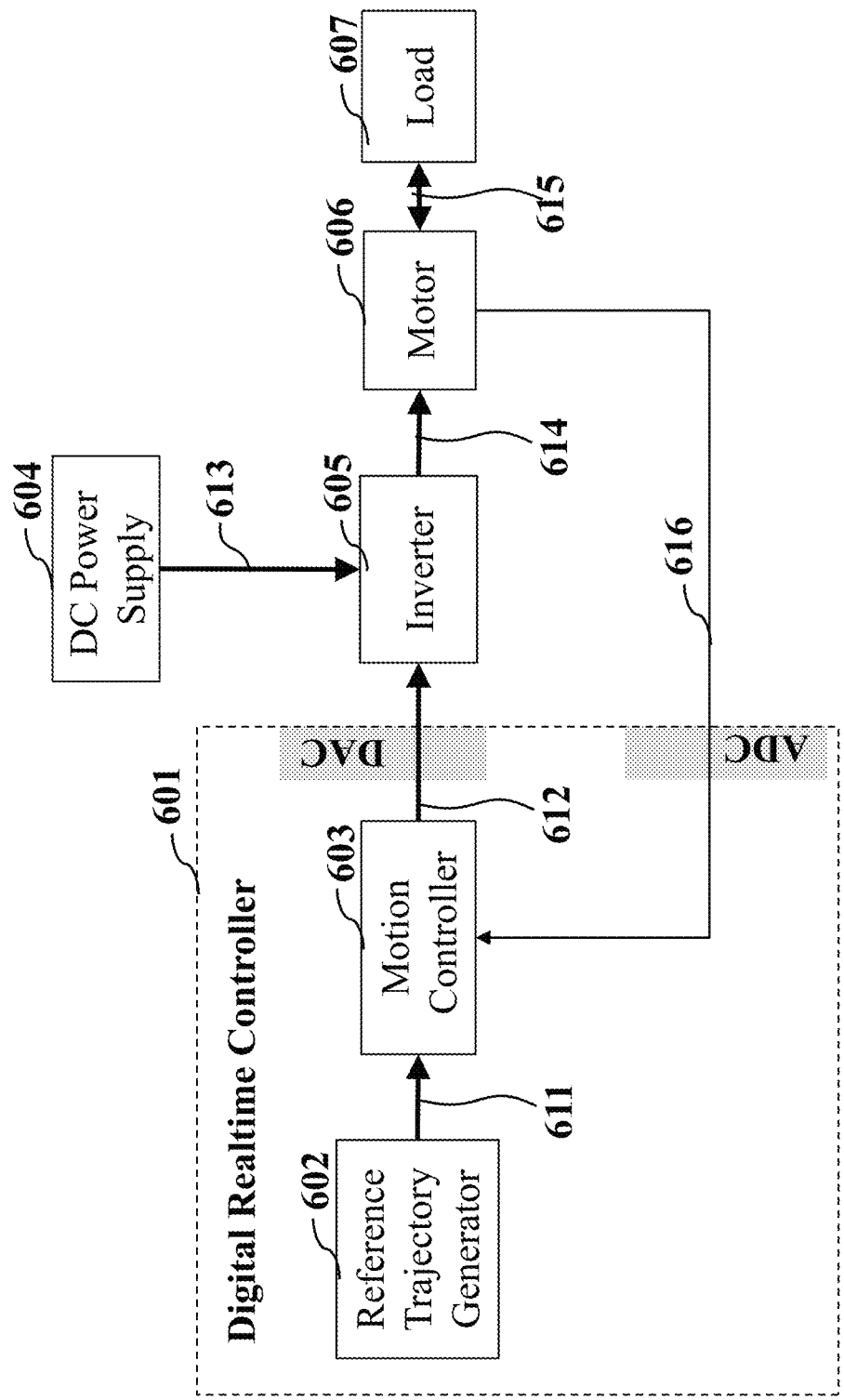
FIG. 6 is a block diagram illustrating a motor drive and control system, according to some embodiments of the present disclosure.

FIG. 6 is a block diagram illustrating a motor drive and control system, according to some embodiments of the present disclosure. For example, 6 shows a block diagram of the control system for the invented motor. The invented motor 606 is connected with the load 607 through connection 615. The motor's angular position was measured by a position sensor (not shown), such as encoder and hall-effect sensor, and the measured angular position signal 616 was fedback into the analog/digital converter of the digital realtime controller 601. The reference trajectory signal 611 is generated by the reference trajectory generator 602. Both the motor's measured position 616 and the reference trajectory 611 are fed into the motion controller 603, which generates a control effort signal 612 in the form of digital PWM signals. A DC power supply 604 generates a high-voltage DC power 613 which supplies the DC bus for the invertor 605. The PWM signal 612 controls the gates in the inverter 605, which generates high-voltage signals 614 and energize the winnings in the motor 606. With such control system, the motor's position can be controlled to follow the reference trajectory.

Figure 7:
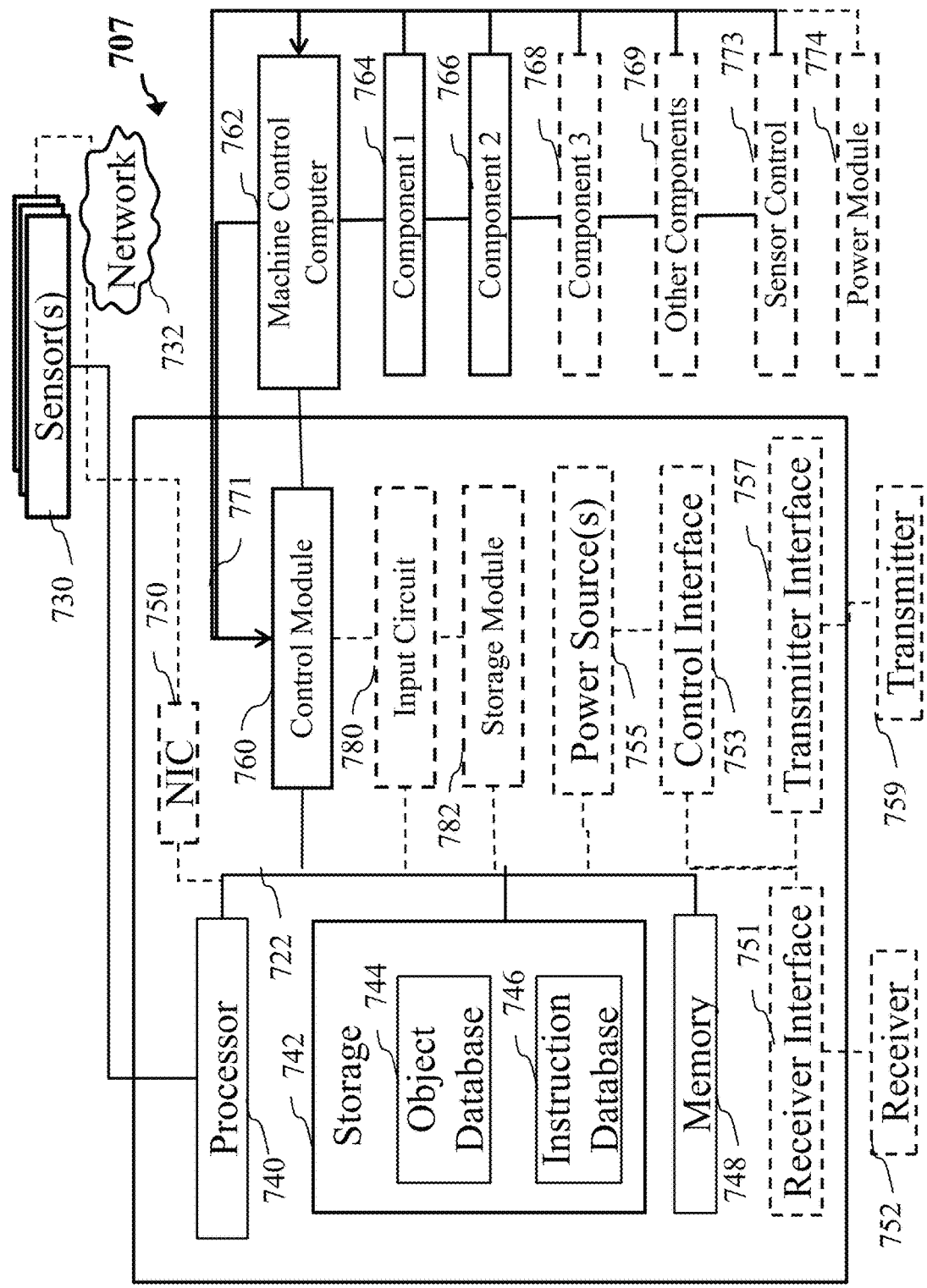
FIG. 7 is a schematic diagram illustrating some components for a processor in communication with a controller system of a machine including an induction motor, according to some embodiments of the present disclosure.

FIG. 7 is a schematic diagram illustrating some components for a computing system 707 having a processor 740 connected to a control system 762 of a machine (not shown), such as a PM machine or similar type of machine, according to some embodiments of the present disclosure. For example, the processor 740 can be located approximate the machine (not shown) or within the machine. The processor 740 can be connected to sensors 730 located within an environment (not shown) and positioned within a sensing distance of the processor 740 and the machine (not shown). The sensors 730 can be cameras, video cameras, speed sensors, light sensors, environmental related sensors (i.e. temperature, humidity, fire, air, water, barometer sensors, etc.), used with the machine (not shown). The sensors 730 can be hardwired and/or wireless, such that a network 732 can be within an operating distance range of the sensors 730.

The processor 740 is connected to a bus system 722 that connects to storage 742. The storage 742 can include a database 744, an instruction database 746, an historical database (not shown), an instruction historical database (not shown), an environmental database (not shown), a machine database (not shown) associated with the operation of the machine, other databases (not shown) can have data related to operation and information usable for optimizing, managing or operating the machine (not shown). Again, depending upon each user/operator's specific operational configurations/structure/special needs/sensitivities of the intended use of the machine, many different configurations are contemplated.

Still referring to FIG. 7, a memory 748 is connected to the bus system 722, along with a receiver interface(s) 751, a receiver(s) 752 and a power source(s) 755. The power source(s) 755 can be connected to the bus system 722, connected to a control interface 753, or be configure to have a multitude of other configurations, all of which, is contemplated depending on the specific user/operator intended specific needs for operations. It is possible the power source(s) can be electric, renewable energy sources, chemical, as well as directly connected to the machine, have a multiple external power sources of different types, or both. A transmitter interface(s) 757 and transmitter(s) 759 are connected to the bus system 722. Also, a network interface controller 750 (NIC, also known as a network interface card, network adapter, LAN adapter or physical network interface, and by similar terms, is a computer hardware component connecting a computer to a computer network) is connected to the bus system 722 and can be in communication with a network 732 or other different types of wireless networks (not shown). Again, depending upon the special needs for operation & sensitives needed by a user/operator for their intended use.

A control module(s) 760 can be connected to the bus system 722. The control module(s) 760 can be connected to a machine control computer(s) 762, that assist in directing components of the machine control computer 762. Some components can include, by non-limiting example, component 1 764, component 2 766, component 3 768, and other machine related components 769, which all can be connected to the machine control computer(s) 762, and/or the control module 760, via 771. The control Module 760 can be configured from the machine control computer 762 to check a machine component(s) status once, and report back, thereby providing management of the machine, operational optimization/performance along with other related service and monitoring capabilities. Contemplated is that the machine control computer can have a power module 774, that can include any power source that provides power to the machine (not shown) such as a power adaptor or a rechargeable battery pack depending on the user specific requirements.

Still referring to FIG. 7, the processor 740 can implement or execute stored instructions that are stored in memory 748, storage 742 or access from a cloud storage via the network 732, in particular, the processor 740 can access the prestored data including data from the database 744, the instruction database 746, or other stored data from other databases (not shown), as noted above.

Still referring to FIG. 7, the machine control computer 762 provide commands and implement changes to one or more components of the machine associated with aspects of the models of the present disclosure. Contemplated is that the computer system 707 can include a sensor control 773 connected to the components 764, 766, 768 of the machine. Also contemplated is that some component sensors (i.e. sensors associated with the machine, or any other components of the machine or associated with components associated with the machine), and other components (not shown) can be utilized. Contemplated is that multiple types of sensors can be located on or in an approximate area of the machine.

The sensor control computer 773 can include a hardware processor (not shown) connected a memory (not shown) that includes stored software (not shown). The hardware processor (not shown) can implement or execute stored instructions that are stored in memory (not shown), and when any sensor data is received, the received data can be compared to stored data, and send sensor data/signals, such warning messages, a level of performance associated with one or more components of the machine, etc., to the machine control computer 762 or other components of the machine or computer system 707. Another aspect of the systems and components of the present embodiments are that software or hardware, or some combination thereof, can be implemented via localized storage or through a cloud-based system.

Further, the control or controller module 760 can include different applications and programs for implementing methods of the present disclosure. For example, the control module 760 can include applications for processing information received from the machine control computer 762, such as generating graphs, operation related models including 3D models of the environment where the machine is located. The control module 760 can include applications for interpreting control inputs, or input signals, received via the input circuit/interface module 780, storage module 782, and generating commands/actions.

Figure 8:
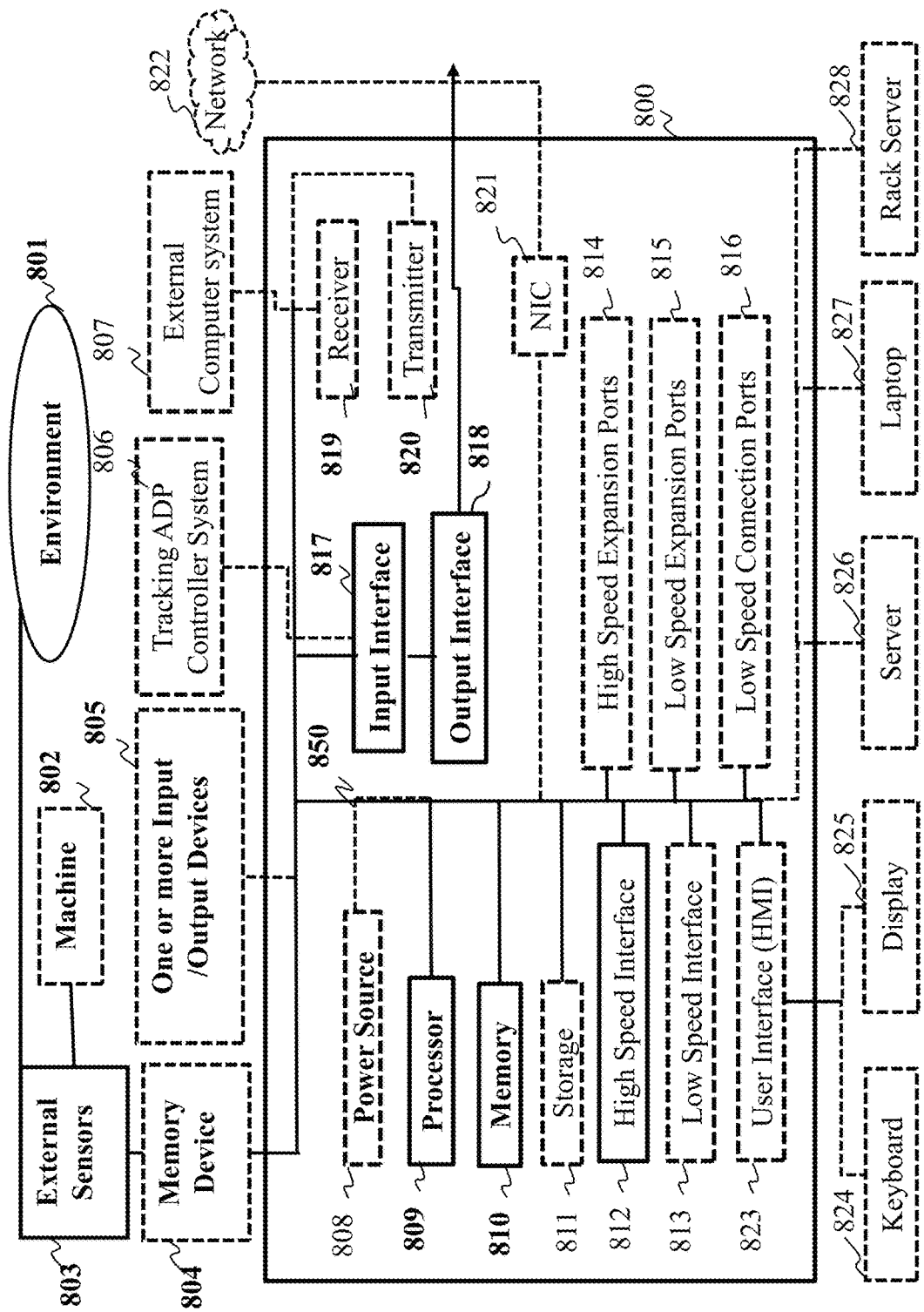
FIG. 8 is a schematic diagram illustrating a centralized controller system that can be used for implementing some systems and methods, according to some embodiments of the present disclosure.

FIG. 8 is a schematic diagram illustrating a centralized controller system that can be used for implementing some methods or may be combined with the processor of FIG. 7, depending on the specific goals of a user, according to some embodiments of the present disclosure. For example, the centralized controller system can be a computing apparatus that represents various forms of digital computers, such as laptops, desktops, workstations, personal digital assistants, servers, blade servers, mainframes, and other appropriate computers.

The centralized controller system 800 can include a power source 808, a processor 809, a memory 810, a storage device 811, all connected to a bus 850. Further, a high-speed interface 812, a low-speed interface 813, high-speed expansion ports 814 and low speed connection ports 815, can be connected to the bus 850. Also, a low-speed expansion port 816 is in connection with the bus 850. Contemplated are various component configurations that may be mounted on a common motherboard, by non-limiting example, 830, depending upon the specific application. Further still, an input interface 817 can be connected via bus 850 to an external receiver 806 and an output interface 818. A receiver 819 can be connected to an external transmitter 807 and a transmitter 820 via the bus 850. Also connected to the bus 850 can be an external memory 804, external sensors 803, machine(s) 802 and an environment 801. Further, one or more external input/output devices 805 can be connected to the bus 850. A network interface controller (NIC) 821 can be adapted to connect through the bus 850 to a network 822, wherein data or other data, among other things, can be rendered on a third-party display device, third party imaging device, and/or third-party printing device outside of the computer device 800.

Contemplated is that the memory 810 can store instructions that are executable by the centralized controller system 800, historical data, and any data that can be utilized by the methods and systems of the present disclosure. The memory 810 can include random access memory (RAM), read only memory (ROM), flash memory, or any other suitable memory systems. The memory 810 can be a volatile memory unit or units, and/or a non-volatile memory unit or units. The memory 810 may also be another form of computer-readable medium, such as a magnetic or optical disk.

Still referring to FIG. 8, a storage device 811 can be adapted to store supplementary data and/or software modules used by the computer device 800. For example, the storage device 811 can store historical data and other related data as mentioned above regarding the present disclosure. Additionally, or alternatively, the storage device 811 can store historical data like data as mentioned above regarding the present disclosure. The storage device 811 can include a hard drive, an optical drive, a thumb-drive, an array of drives, or any combinations thereof. Further, the storage device 811 can contain a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, processor 809), perform one or more methods, such as those described above.

The system can be linked through the bus 850 optionally to a display interface or user Interface (HMI) 823 adapted to connect the system to a display device 825 and keyboard 824, wherein the display device 825 can include a computer monitor, camera, television, projector, or mobile device, among others.

Still referring to FIG. 8, the centralized controller system 800 can include a user input interface 817 adapted to a printer interface (not shown) can also be connected through bus 850 and adapted to connect to a printing device (not shown), wherein the printing device can include a liquid inkjet printer, solid ink printer, large-scale commercial printer, thermal printer, UV printer, or dye-sublimation printer, among others.

The high-speed interface 812 manages bandwidth-intensive operations for the computing device 800, while the low-speed interface 813 manages lower bandwidth-intensive operations. Such allocation of functions is an example only. In some implementations, the high-speed interface 812 can be coupled to the memory 810, a user interface (HMI) 823, and to a keyboard 824 and display 825 (e.g., through a graphics processor or accelerator), and to the high-speed expansion ports 814, which may accept various expansion cards (not shown) via bus 850. In the implementation, the low-speed interface 813 is coupled to the storage device 811 and the low-speed expansion port 815, via bus 850. The low-speed expansion port 815, which may include various communication ports (e.g., USB, Bluetooth, Ethernet, wireless Ethernet) may be coupled to one or more input/output devices 805, and other devices a keyboard 824, a pointing device (not shown), a scanner (not shown), or a networking device such as a switch or router, e.g., through a network adapter.

Still referring to FIG. 8, the centralized controller system 800 may be implemented in several different forms, as shown in the figure. For example, it may be implemented as a standard server 826, or multiple times in a group of such servers. In addition, it may be implemented in a personal computer such as a laptop computer 827. It may also be implemented as part of a rack server system 828. Alternatively, components from the computing device 800 may be combined with other components in a mobile device (not shown), such as a mobile computing device having different component configuration arranged for mobile devices.

Figure 9A:
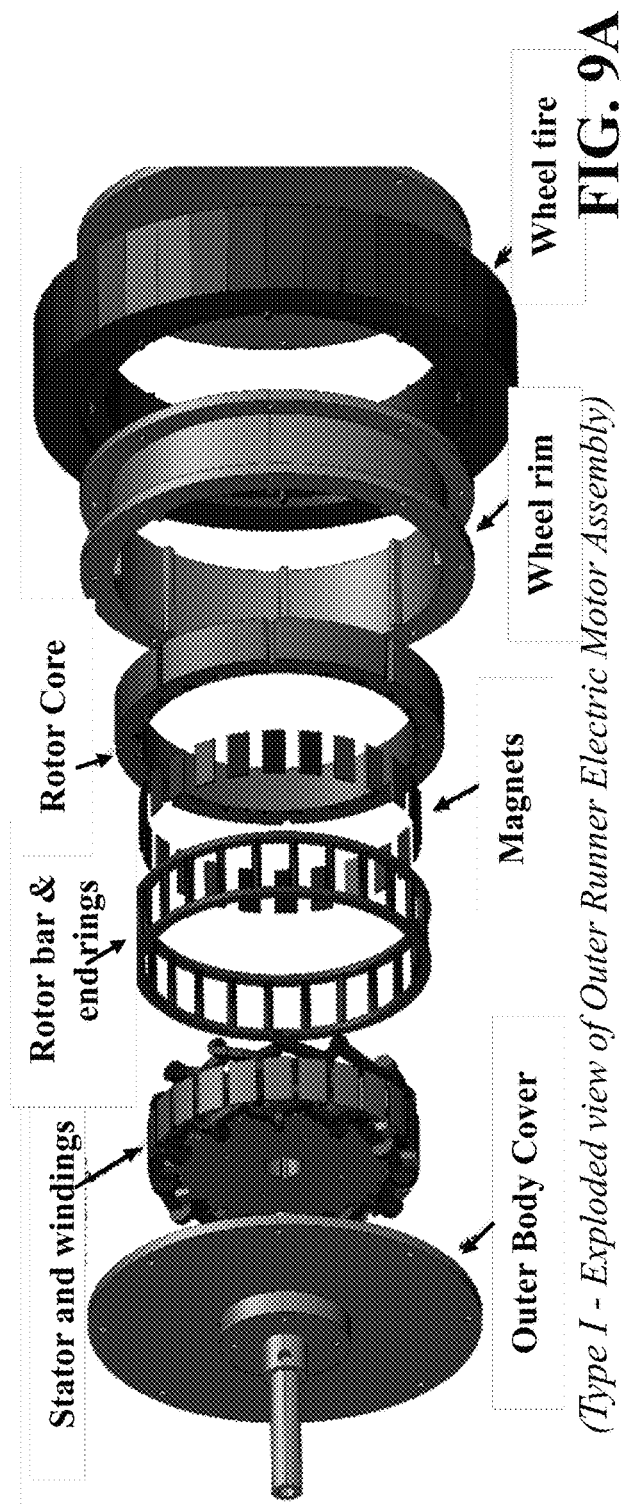
FIG. 9A and FIG. 9B are schematic diagrams of outer runner electric motors.
Figure 9B:
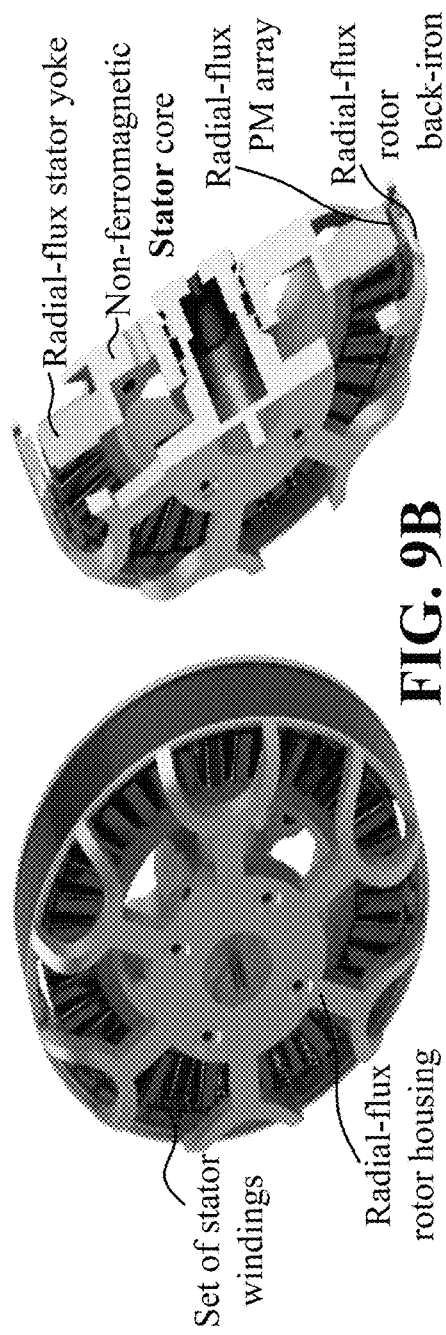

FIG. 9A and FIG. 9B are schematic diagrams of outer runner electric motors, FIG. 9A illustrates a Type I motor, and FIG. 9B illustrates a Type II motor, according to some embodiments of the present disclosure.

For example, FIG. 9A illustrates the type I machine having a stator and windings inside, but the windings are a normal type of distributed winding, not the toroidal winding type. The rotor, rotor core and magnets are outside, and has rotor bars and end rings. Wherein, the embodiments of the present disclosure have no rotor bars and end rings.

Further, FIG. 9B illustrates the type II machine having a stator, windings and a stator core inside, but the windings are normal type of concentrated winding, not the toroidal winding type. The rotor, rotor core and magnets are outside. However, both of the above types of machines have no axial-flux section, whereas the embodiments of the present disclosure have two axial-flux sections of stators and rotors on both axial ends.

Practical Applications

The embodiments of the present disclosure include embodiments with improved motor configurations including combined axial-flux and radial-flux motor designs and outer runner electric motor designs configured with direct-drive applications without gearboxes. These embodiments include stator assemblies with separate electrical-lamination-made stator yokes for axial-flux stator yokes and radial-flux stator yokes. Wherein some aspects for having electrical lamination can include increasing an amount of a motor's torque and reducing an amount of a motor's hysteresis loss. In addition, by incorporating stator assemblies with separate electrical-lamination-made stator yokes, allows for replacing a center volume of the stator core with non-ferromagnetic material, which effectively reduces a motor's total weight, and therefore improves a motor's torque-to-mass ratio. Among the above advantages and benefits, as well as other advantages and benefits, the embodiments of the present disclosure can be utilized in a number of different types of applications, such as, machine-room-less elevators, robot manipulators, precision rotary stages, and in-wheel drives for electric vehicles.

When compared with conventional electric motors for general drivers, the embodiments of the present disclosure targeted and incorporated with direct-drive motors offer specific operational features such as having an ultra-high torque density, low nominal speed, and a relatively high efficiency with a compact form factor. For example, the embodiments of the present disclosure achieve high specific torque (torque per unit mass), high torque density (torque per unit overall volume). Other aspects of the embodiments of the present disclosure having direct-drive motor designs can include a relatively high efficiency, small torque-ripple along with having a compact form, as noted above. To that end, and in view of the above improved operational aspects, the embodiments of the present disclosure will outperform that of conventional motors of the same size and type, in a number of other application areas. For example, such as machine-room-less elevators, robot manipulators, precision rotary stages, and in-wheel drives for electric vehicles, and direct drive electric motor applications without gear boxes. Some reasons why the direct drive electric motor applications industry will prefer the embodiments of the present disclosure over conventional motors of the same size and type can include: (a) effectively reducing a volume of an actuator assembly by eliminating the gearbox and replacing the stator core center with a lighter material, makes the electric motor or the motor drive architecture more compact and lighter; (b) gearbox fault is one of major failure mode for geared motors, and the use of the direct-drive motor is more beneficial in view of reliability due to eliminating the gear box, along with improving the motor's overall torque using the lighter stator core material and new spline-like structure; (c) a simpler actuator assembly without gearbox as well as being able to use laminated sheets with the stator yokes help reduce the system's overall manufacture costs; (d) by eliminating gearboxes which have nonlinear dynamics such as backlash hysteresis, nonlinear Coulomb friction, and can impair the system's dynamic performance, is not favorable for precision applications, along with an improved stator assembly having a new stator core center and spline-like structure provides for a more longer lasting motor in view of being able to withstand more operational wear and tear and abuse.

Thus, based upon the innovative motor design configurations of the embodiments of the present disclosure, they are particular configured to be utilized in a number of different applications such as robot manipulators, precision rotary stages, and in-wheel drives for electric vehicles, since for these applications demand attributes of electric machines that have an increased torque & specific torque, compact size, reduced amount of overall weight, and other attributes associated with the above noted other advantages and benefits stated herein, which will outperform the same size and type conventional motors, as at least for the reasons stated herein.

Other applications for the innovative motor design configurations of the embodiments of the present disclosure, can also include various application areas, such as machine tools, industrial machinery, home appliances, electric vehicles, etc. Some other benefits and advantages of the embodiments of the present disclosure can include having a reduced an amount of the stator's manufacturing costs due to taking advantage of the conventional electrical laminations, i.e. when compared to a convention electric motor of the same size. Further, more benefits and advantages can include: (1) an increase in an amount of a motor's total torque due to the higher material permeability; (2) having a lower amount of hysteresis loss; (3) compact size; (4) a reduced amount of overall weight; (5) an improved amount of performance. The five above mentioned advantages are based on comparing each above stated advantage to an amount of a conventional motor or types of conventional motors of a same size and types conventional motors associated performance, a motor's size, a motor's volume, a motor's mass, a motor's weight, etc., as at least for the reasons stated herein.

Features

According to an embodiment of the present disclosure, an electrical machine that is an axial-flux and radial-flux motor including a rotor mounted rotatably about a machine axis, with the rotor rotatively attached to a shaft. A stator assembly having a stator core with a non-ferromagnetic material. A radial-flux stator yoke having a continuous inner wall rigidly attached on a continuous outer wall of the stator core. A first axial-flux stator yoke with an inner wall rigidly attached on an outer surface of a first edge wall of the stator core; A second axial-flux stator yoke having an inner wall rigidly attached on an outer surface of a second edge wall of the stator core. Wherein the radial-flux stator yoke and the first and the second axial-flux stator yokes, each include laminated sheets and slots. Windings are positioned in the slots of the radial-flux stator yoke and the first and the second axial-flux stator yokes. Wherein the stator core and the shaft include a spline coupling feature adapted to selectively couple and mate the stator core to the shaft. Wherein the following aspects below are contemplated as configuring a modified embodiment of the above embodiment for one or a combination of the following aspects below.

An aspect including the spline coupling feature includes the stator core having an external spline structure and the shaft having a corresponding internal spline structure, such that the shaft is adapted to be inserted into or removed from the stator core. Another aspect is the shaft is a hollow stationary shaft with the rotor rotatively attached to the stationary shaft using bearings.

An aspect further including a two axial-flux rotor assembly rotatively attached to the shaft via bearings and engages with the first and second axial-flux stator yokes. Each axial-flux rotor assembly having an axial-flux rotor housing rigidly attached to an outer race of bearings, an axial-flux rotor back-iron attached to the axial-flux rotor housing, and an axial-flux permanent magnet array attached to the axial-flux rotor back-iron. Wherein an aspect further includes a radial-flux rotor assembly rigidly connected to each axial-flux rotor assembly axial-flux rotor housing of the two axial-flux rotor assembly, and rotatively engaged with the radial-flux stator yoke. Wherein the radial-flux rotor assembly includes a radial-flux rotor housing rigidly attached to each axial-flux rotor assembly axial-flux rotor housing of the two axial-flux rotor assembly. A radial-flux rotor back-iron attached to the radial-flux rotor housing, and a radial-flux permanent magnet array attached to each axial-flux rotor assembly axial-flux rotor back-iron axial-flux rotor housing of the two axial-flux rotor assembly.

Another aspect is the radial-flux stator yoke and the first and the second axial-flux stator yokes include laminated sheets having one of, a spiral-shaped electrical lamination, a stacked electrical lamination, a solid material or at least one power material formulated into the radial-flux stator yoke and the first and the second axial-flux stator yokes. Wherein an aspect is the non-ferromagnetic material of the stator core is a material that is one of plastic, carbon fiber reinforced polymer, fiberglass or an iron (ferrous) free material.

Still another aspect is the non-ferromagnetic material of the stator core includes at least 90% of one or more non-ferromagnetic materials. Such that an aspect can be the non-ferromagnetic material of the stator core is a material that is one or more non-ferromagnetic metals obtained from sulfide, carbonate or silicate minerals, and is non-magnetic. Further still an aspect may be the non-ferromagnetic material of the stator core includes a level of an electrically conductive material having a level of mechanical stiffness associated with one of titanium, fiber glass or acetal homopolymer. It is possible that an aspect can be the windings are thermally connected to the shaft, such that the windings are positioned in the slots of the radial-flux stator yoke and the first and the second axial-flux stator yokes, and forms a toroid-shaped stator assembly.

According to another embodiment of the present disclosure, an electrical machine that is an outer runner motor having a rotor mounted rotatably about a machine axis, with the rotor rotatively attached to a shaft. A stator assembly having a stator core with a non-ferromagnetic material. An axial-flux yoke with an inner wall rigidly attached on an outer surface of a first edge wall of the stator core, or a radial-flux yoke with a continuous inner wall rigidly attached on a continuous outer wall of the stator core. Wherein the axial-flux yoke or the radial-flux yoke, include laminated sheets and slots. Windings can be positioned in the slots of either the axial-flux stator yoke or the radial-flux stator yoke. Wherein the stator core and the shaft include a spline coupling feature adapted to selectively couple and mate the stator core to the shaft. Wherein the following aspects below are contemplated as configuring a modified embodiment of the above embodiment for one or a combination of the following aspects below.

An aspect is that the spline coupling feature includes the stator core having an external spline structure and the shaft having a corresponding internal spline structure, such that the shaft is adapted to be inserted into or removed from the stator core. Further an aspect can be wherein the stator core external spline structure includes teeth on an inner surface of an inner wall of the stator core that engage with the corresponding internal spline structure that has grooves on an outer surface of the shaft, so that the stator core is attached to the shaft, of which the rotor rotates around the same shaft, in order to transmit a torque action to produce a torque force.

Wherein an aspect is that the non-ferromagnetic material of the stator core includes at least 85% of one or more non-ferromagnetic materials. It is possible that an aspect is the windings includes a set of toroid-shaped multiphase windings configured within the slots of either the axial-flux stator yokes or the radial-flux stator yoke. Another aspect is the windings are thermally connected to the shaft, such that the windings are positioned in the slots of the axial-flux stator yoke or the radial-flux stator yoke and forms a toroid-shaped stator assembly. Further still an aspect can be windings are wrapped around an assembled stator yoke including either the axial-flux stator yoke or the radial-flux stator yoke, and the windings include a winding pattern having end turns which are termed toroidal windings, such that the toroidal windings reduces an amount of a length of the end turns, resulting in an increase in an amount of overall efficiency of the electrical machine, when compared with a similarly configured electric machine without the toroidal windings. Further an aspect is the windings are wrapped around an assembled stator yoke including either the axial-flux stator yoke or the radial-flux stator yoke, and the windings include multiple loops of magnetic copper wires and have three-phases along with a pole pair number. Another aspect is the windings include a copper material and are wrapped around an assembled stator yoke including either the axial-flux stator yoke or the radial-flux stator yoke, and the windings include a winding pattern with end turns that are termed toroidal windings, such that the toroidal windings reduces an amount of a length of the end turns, resulting in a total amount of a motor's windings copper loss which improves a motor's overall efficiency.

Definitions

According to aspects of the present disclosure, and based on experimentation, the following definitions have been established, and certainly are not a complete definition of each phrase or term. Wherein the provided definitions are merely provided as an example, based upon learnings from experimentation, wherein other interpretations, definitions, and other aspects may pertain. However, for at least a mere basic preview of the phrase or term presented, such definitions have been provided.

Spline-like structures vs. Keyed shafts: Splines are used in mechanical drive systems and can be located in rotating devices in our everyday life. Splines are elevated ridges that mesh with grooves in a connecting component resulting in the transfer of torque. Shafts that are splined are usually one component in a number of mechanisms working in a linear motion. Keyed shafts are defined by two features: the shaft and the rotating element which has a key seat. Keyed shafts are usually one system in a number of mechanisms working in rotating motion.

Unlike keyed shafts, splined shafts can reduce torque transmission capacity. Splines also offer a more uniform transfer of torque and provide equal distribution of a load along the teeth sides of the gear. The result is that the splined shaft experiences a longer fatigue life and is more likely to shield against wear and tear. Some different types of splines tested during experimentation included: (a) Helical splines-These splines have equal groove space between teeth forming a helix with the sides parallel or involute. This design is ideal at allowing rotary and linear motion between parts as well as minimizing stress concentrations under a high load; (b) Crowned splines-Like helical splines, crowned splines also have equally spaced grooves that are involute. However, crowned splines have modified teeth that act as allowance for potential misalignment; (c) Ball splines-This splined shaft has outer teeth part that have a ball bearing, enabling free linear motion despite high torque-(d) Parallel key splines-As the name suggests, the equally spaced grooves are parallel in both radial and axial directions. Parallel key splines can be cut or cold roll formed. Of these two methods rolled splines are 35% stronger, making them suitable for applications requiring accuracy, high strength, while still offering a smooth finish. For these reasons, shafts that are splined are preferred over key shafts.

Splines are usually composed of both internal and external spline. External splines are cut through a milling machine and internal splines are cut through a type of slotting machine. Manufacturing internal splines is limited in comparison to external splines, as accessibility restrictions tend to be more limited. External splines can be manufactured utilizing a range of processes.

Torque: Torque is defined as the measure of the turning force on an object being rotated, such as a bolt or an automotive flywheel. Torque is a measure of the turning force on an object being rotated, such as a bolt or an automotive flywheel. Again, returning to basic physics: $T=F*r$ where T=torque, F=the force applied and r=the radius of the arc along which the force is applied, as shown in FIG. 2. Torque is usually expressed in units of Newton-meters or foot-pounds.

Torque Density: Torque density expresses the ratio of torque capability to volume, in units of Joules per cubic meter or foot-pounds per cubic foot. In short, torque density measures the torque-carrying capability of a component in each weight and space envelope. In short, it measures the torque-carrying capability of a component in each weight and space envelope. Why torque density is important in machine design: In the design of mechanical systems, torque density can be used to make smarter design decisions. Using consumer product analogies, purchase choices are often incorrectly made based on "brute force" factors such as how many Watts an amplifier puts out, or the horsepower rating of an engine in a pressure washer. More in-depth considerations review how efficiently an amplifier delivers a signal to its speakers, or how much water flow the pressure washer delivers at a certain pressure.

Paybacks from using torque density for product design and selection: The need to deliver torque is often a complex challenge. A traditional approach based on power or rotational speed might lead to unnecessarily bulky solutions. By using torque density as a key parameter, numerous paybacks can be achieved, such as: (a) More efficient operation through space savings; (b) Cost savings due to optimal component selection; (c) Innovative designs and new products; (d) Extended equipment life due to better-matched components; and (e) Noise reduction due to smaller motors. With torque density at the forefront, designers, manufactures, and end users can all benefit from smarter machine designs.

Magnetization: Magnetization, M is due to the tendency of the atomic components of matter to behave as magnetic dipoles. This magnetization is a sum of two parts: the magnetization due to the magnetic polarization present in the material and the induced polarization. The first is the primary magnetization, Mpri, and the latter the secondary magnetization. The primary magnetization is the magnetic field associated with the matter without any external excitation. This magnetic field originates from the magnetic dipoles in the matter. The secondary magnetization of the material is the polarization induced in the matter due to external fields.

Motor Windings: Motor windings can take many shapes or forms. However, 3-phase distributed windings are the most used in AC motors for industrial applications, which will be the focus of this article. The discussion which follows is equally applicable to the use of this type of winding in induction motors or in permanent magnet synchronous motors. The objective of the distributed winding is to produce a sinusoidal Magneto-Motive Force (MMF) distribution in the motor airgap. This MMF is produced when a balanced set of 3 phase AC currents flow in the phase windings. It is the MMF, combined with the motor magnetic circuit design, which gives rise to a travelling wave of flux in the airgap to produce the required motor torque. Windings are made up of several coils wound from insulated copper or in some cases aluminum wire. Several strands of wire can be connected in parallel to form a single conductor which is then wound into a coil which will have several turns. The number of turns will depend on specific design requirements. A distributed winding consists of several coils inserted into the slots of the motor stator as shown below. The number of coils will depend on the number of stator slots, the number of phases (in our case 3) and the number of motor poles, p. Each coil will span several slots. A full-pitch winding will have coils whose average span corresponds to a number of slots equal to the pole-pitch or 360°/p whereas a short-pitch winding will span fewer slots. The Figure below shows a full-pitch winding for a typical 4 pole motor. A part of the winding will be in the slot where it contributes to motor torque production. The remainder will be in the end windings which do not contribute to motor torque production. Careful design is therefore needed to avoid an unnecessary waste of expensive copper. Furthermore, good thermal performance drives the need for high slot fill and end winding thermal management. These factors are often limited by manufacturing process considerations. An ideal distributed winding will have an infinite number of coils placed in an infinite number of slots such that the MMF space distribution is a perfect sinusoid. This is clearly not possible in practice, so a best compromise needs to be found to meet the required performance. Coils of different phases need to be insulated from each other and from the stator core in order to avoid short circuits and failure. Insulation constitutes additional thermal barriers which will limit the ability to transfer heat from the inside of the machine to the outside. Air voids will be present between winding wires and between the insulation, winding and stator core. These voids are filled with a resin using an impregnation process which improves heat transfer and further improves winding insulation.

Electric motor Winding designs: Winding designs for electric motor applications are many and varied. Different applications impose different requirements on the motor design. Several of these requirements will be impacted by the winding design and can include: (a) Minimization of harmonic losses for improved efficiency; (b) Reduce torque pulsations; and (c) Reduce acoustic noise and vibrations. Several winding layouts are possible to achieve the same electrical performance. The choice of these layouts will be determined by manufacturing constraints which are strongly influenced by the level of automation used to produce the winding.

Flux: Flux is the presence of a force field in a specified physical medium, or the flow of energy through a surface. In electronics, the term applies to any electrostatic field and any magnetic field. Flux is depicted as "lines" in a plane that contains or intersects electric charge poles or magnetic poles.

Radial Flux: A radial flux motor has its flux running in and out from the center of the shaft—on the radius—thus, "radial". The air gap—the space between the rotor and the magnets—can also describe the motor, but when you're looking at the air gap, think of it as a dimension.

Torque: Torque is the measure of the circular force whose effect can rotate the object. In other words, it is the product of the force and the distance. The torque is also called the twisting power. The SI unit of torque is newton-meter and newton-meter is equivalent to joule. Examples of torque can be tightening or opening the cap of the bottle, we have applied force through the hand. The more force we apply, the more torque is increased. Also, for tightening or loosing the nut through spanner and for twisting the steering of the car torque is applied. Torque equal to Force times Distance.

Embodiments

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims. Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements. Although the present disclosure has been described with reference to certain preferred embodiments, it is to be understood that various other adaptations and modifications can be made within the spirit and scope of the present disclosure.

What is claimed is:

1. An electrical machine that is an outer runner motor, comprising:
   a rotor mounted rotatably about a machine axis, with the rotor rotatively attached to a shaft;
   a stator assembly having a stator core with a non-ferromagnetic material, and including
      an axial-flux yoke having an inner wall rigidly attached on an outer surface of a first edge wall of the stator core, or a radial-flux yoke having a continuous inner wall rigidly attached on a continuous outer wall of the stator core, wherein the axial-flux yoke or the radial-flux yoke, include laminated sheets and slots;
      windings are positioned in the slots of either the axial-flux stator yoke or the radial-flux stator yoke, and
      wherein the stator core and the shaft include a spline coupling feature adapted to selectively couple and mate the stator core to the shaft.

2. The electrical machine of claim 1, wherein the spline coupling feature includes the stator core having an external spline structure and the shaft having a corresponding internal spline structure, such that the shaft is adapted to be inserted into or removed from the stator core.

3. The electrical machine of claim 2, wherein the stator core external spline structure includes teeth on an inner surface of an inner wall of the stator core that engages with the corresponding internal spline structure that has grooves on an outer surface of the shaft, so that the stator core is attached to the shaft, of which the rotor rotates around the same shaft, in order to transmit a torque action so that the stator assembly is fixed to the shaft in order to transmit a torque action and maintain an angular correspondence, to produce a torque force.

4. The electric machine of claim 1, wherein the windings includes a set of toroid-shaped multiphase windings configured within the slots of either an outer wall of the axial-flux stator yoke or the radial-flux stator yoke.

5. The electrical machine of claim 1, wherein the windings are thermally connected to the shaft, such that the windings are positioned in the slots of the axial-flux stator yoke or the radial-flux stator yoke and forms a toroid-shaped stator assembly.

6. The electrical machine of claim 1, wherein the windings are wrapped around an assembled stator yoke including either the axial-flux stator yoke or the radial-flux stator yoke, and the windings include a winding pattern having end turns which are termed toroidal windings, such that the toroidal windings reduces an amount of a length of the end turns, resulting in an increase in an amount of overall efficiency of the electrical machine, when compared with a similarly configured electric machine without the toroidal windings.

7. The electrical machine of claim 1, wherein the windings are wrapped around an assembled stator yoke including either the axial-flux stator yoke or the radial-flux stator yoke, and the windings include multiple loops of magnetic copper wires and have three-phases along with a pole pair number.

8. The electrical machine to claim 1, wherein the windings include a copper material and are wrapped around an assembled stator yoke including either the axial-flux stator yoke or the radial-flux stator yoke, and the windings include a winding pattern with end turns that are termed toroidal windings, such that the toroidal windings reduces an amount of a length of the end turns, resulting in a total amount of a motor's windings copper loss which improves a motor's overall efficiency.

9. The electric machine of claim 1, wherein the laminated sheets of the radial-flux stator yoke and the first and the second axial-flux stator yokes include one of, a spiral-shaped electrical lamination, a stacked electrical lamination, a solid material or at least one power material formulated into the radial-flux stator yoke and the first and the second axial-flux stator yokes.

10. The electrical machine to claim 1, wherein the non-ferromagnetic material of the stator core includes at least 85% of one or more non-ferromagnetic materials.

11. The electrical machine of claim 1, wherein the non-ferromagnetic material of the stator core is a material that is one of plastic, carbon fiber reinforced polymer, fiberglass or an iron (ferrous) free material.

12. The electrical machine of claim 1, wherein the non-ferromagnetic material of the stator core includes a level of an electrically conductive material and a level of mechanical stiffness associated with one of titanium, fiber glass or acetal homopolymer.

13. An electrical machine that is an axial-flux and radial-flux motor, comprising:
   a rotor mounted rotatably about a machine axis, with the rotor rotatively attached to a shaft; and
   a stator assembly having a stator core with a non-ferromagnetic material, and including
      a radial-flux stator yoke including a continuous inner wall rigidly attached on a continuous outer wall of the stator core;
      a first axial-flux stator yoke with an inner wall rigidly attached on an outer surface of a first edge wall of the stator core, and a second axial-flux stator yoke having an inner wall rigidly attached on an outer surface of a second edge wall of the stator core, wherein the radial-flux stator yoke and the first and the second axial-flux stator yokes, each include laminated sheets and slots;
      windings are positioned in the slots of the radial-flux stator yoke and the first and the second axial-flux stator yokes; and
      wherein the stator core and the shaft include a spline coupling feature adapted to selectively couple and mate the shaft to the stator assembly, such that the spline coupling feature includes the stator core having an external spline structure and the shaft having a corresponding internal spline structure, such that the shaft is adapted to be inserted into or removed from the stator core.

14. The electrical machine of claim 13, wherein the shaft is a hollow stationary shaft with the rotor rotatively attached to the stationary shaft using bearings.

15. The electrical machine of claim 13, further comprising:
   a two axial-flux rotor assembly rotatively attached to the shaft via bearings, and engages with the first and second axial-flux stator yokes, each axial-flux rotor assembly having an axial-flux rotor housing rigidly attached to an outer race of bearings, an axial-flux rotor back-iron attached to the axial-flux rotor housing, and an axial-flux permanent magnet array attached to the axial-flux rotor back-iron.

16. The electrical machine of claim 15, further comprising:
   a radial-flux rotor assembly rigidly connected to each axial-flux rotor assembly axial-flux rotor housing of the two axial-flux rotor assembly, and rotatively engaged with the radial-flux stator yoke, wherein the radial-flux rotor assembly includes a radial-flux rotor housing rigidly attached to each axial-flux rotor assembly axial-flux rotor housing of the two axial-flux rotor assembly, a radial-flux rotor back-iron attached to the radial-flux rotor housing, and a radial-flux permanent magnet array attached to each axial-flux rotor assembly axial-flux rotor back-iron axial-flux rotor housing of the two axial-flux rotor assembly.

17. The electrical machine to claim 13, wherein the non-ferromagnetic material of the stator core includes at least 90% of one or more non-ferromagnetic materials.

18. The electrical machine of claim 13, wherein the non-ferromagnetic material of the stator core is a material that is one or more non-ferromagnetic metals obtained from sulfide, carbonate or silicate minerals, and is non-magnetic.

19. The electrical machine of claim 13, wherein the windings are thermally connected to the shaft, such that the windings are positioned in the slots of the radial-flux stator yoke and outer walls of the first and the second axial-flux stator yokes, and forms a toroid-shaped stator assembly.

20. A system comprising:
   a transceiver to receive signals from sensors associated with an axial-flux and radial-flux (AFARF) motor;
   a digital controller configured to receive the signals, and generate control signals specifying values of one or combination of a multi-phase voltage or a current for the AFARF motor, for tracking a reference trajectory of torques of the AFARF motor, wherein the AFARF motor has a load whose positioned by the AFARF motor and is controllable by the digital controller, such that the AFARF motor includes:
   a rotor mounted rotatably about a machine axis, with the rotor rotatively attached to a shaft; and
   a stator assembly having a stator core with a non-ferromagnetic material;
      a radial-flux stator yoke including a continuous inner wall rigidly attached on a continuous outer wall of the stator core;
      a first axial-flux stator yoke with an inner wall rigidly attached on an outer surface of a first edge wall of the stator core, and a second axial-flux stator yoke having an inner wall rigidly attached on an outer surface of a second edge wall of the stator core, wherein the radial-flux stator yoke and the first and the second axial-flux stator yokes, each include laminated sheets and slots;
      windings are positioned in the slots of the radial-flux stator yoke and the first and the second axial-flux stator yokes, and
      wherein the stator core and the shaft include a spline coupling feature adapted to selectively couple and mate the shaft to the stator assembly.

* * * * *